US009684075B2

(12) United States Patent
Xue et al.

(10) Patent No.: US 9,684,075 B2
(45) Date of Patent: Jun. 20, 2017

(54) SCANNING LASER TIME OF FLIGHT 3D IMAGING

(75) Inventors: Bin Xue, Mukilteo, WA (US); Robert James Jackson, Monroe, WA (US); Joshua O. Miller, Woodinville, WA (US); Steve Holmes, Sammamish, WA (US); Margaret K. Brown, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 1371 days.

(21) Appl. No.: 13/282,851

(22) Filed: Oct. 27, 2011

(65) Prior Publication Data

US 2013/0107000 A1     May 2, 2013

(51) Int. Cl.
| | |
|---|---|
| *H04N 13/02* | (2006.01) |
| *G01J 1/44* | (2006.01) |
| *H01S 3/13* | (2006.01) |
| *G01S 17/42* | (2006.01) |
| *G01S 17/02* | (2006.01) |
| *G01S 17/89* | (2006.01) |
| *G01S 7/481* | (2006.01) |
| *G01S 17/10* | (2006.01) |
| *G01S 7/486* | (2006.01) |

(52) U.S. Cl.
CPC ............ *G01S 17/42* (2013.01); *G01S 7/4817* (2013.01); *G01S 7/4861* (2013.01); *G01S 7/4865* (2013.01); *G01S 7/4868* (2013.01); *G01S 17/023* (2013.01); *G01S 17/10* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 3,954,335 | A * | 5/1976 | Bodlaj | 356/3.02 |
| 5,612,529 | A * | 3/1997 | Coleman | 235/455 |
| 7,071,594 | B1 * | 7/2006 | Yan et al. | 310/309 |
| 7,262,765 | B2 * | 8/2007 | Brown et al. | 345/207 |
| 2003/0010888 | A1 * | 1/2003 | Shimada et al. | 250/201.1 |
| 2007/0005609 | A1 * | 1/2007 | Breed | 707/10 |
| 2007/0046329 | A1 * | 3/2007 | Minzoni | 326/83 |
| 2008/0062161 | A1 * | 3/2008 | Brown et al. | 345/207 |
| 2008/0230611 | A1 * | 9/2008 | Sprague et al. | 235/462.22 |
| 2009/0153932 | A1 * | 6/2009 | Davis et al. | 359/199.2 |
| 2009/0160833 | A1 * | 6/2009 | Brown et al. | 345/207 |
| 2009/0256973 | A1 * | 10/2009 | Bazzani et al. | 348/744 |
| 2009/0314949 | A1 * | 12/2009 | Plettner et al. | 250/397 |
| 2010/0053591 | A1 * | 3/2010 | Gibson et al. | 356/3.09 |
| 2010/0156863 | A1 * | 6/2010 | Brown et al. | 345/207 |
| 2011/0102763 | A1 * | 5/2011 | Brown et al. | 356/4.01 |

* cited by examiner

*Primary Examiner* — Mohammad J Rahman
(74) *Attorney, Agent, or Firm* — Kevin D. Wills

(57) ABSTRACT

Laser light pulses are reflected off a scanning mirror. A time-of-flight distance measurement device receives reflected light pulses and determines distances. The light pulses have abrupt changes in amplitude. Reflected pulses are differentiated to reduce sensitivity to amplitude variations. Differentiated pulses may be compressed to keep the receiver from saturating. Distance measurements are combined with location information to produce a 3D image of a surface.

20 Claims, 19 Drawing Sheets

SCANNING LASER TIME OF FLIGHT 3D IMAGING

FIELD

The present invention relates generally to distance measurement systems, and more specifically to laser based distance measurement systems.

BACKGROUND

Laser Time of Flight (TOF) distance measurement systems typically measure the round-trip time of a laser light pulse that has reflected off a target. Typical laser TOF systems fire a single shaped laser light pulse with a pulse width in the range of 5-10 nanoseconds (ns). The reflected optical pulse typically maintains a similar pulse shape; however the reflected optical intensity may vary more than 120 dB when the distance to the target varies from between about one meter and 100 meters. With simple amplitude detection at a fixed threshold, timing errors resulting from amplitude variations may be on the order of 2-4 ns, which is equivalent to a distance measurement uncertainty of 300-600 millimeters (mm). Due to this limited resolution and accuracy, typical laser TOF systems are used for long distance measurement applications, for example, greater than 100 meters.

DESCRIPTION OF EMBODIMENTS

Figure 1:
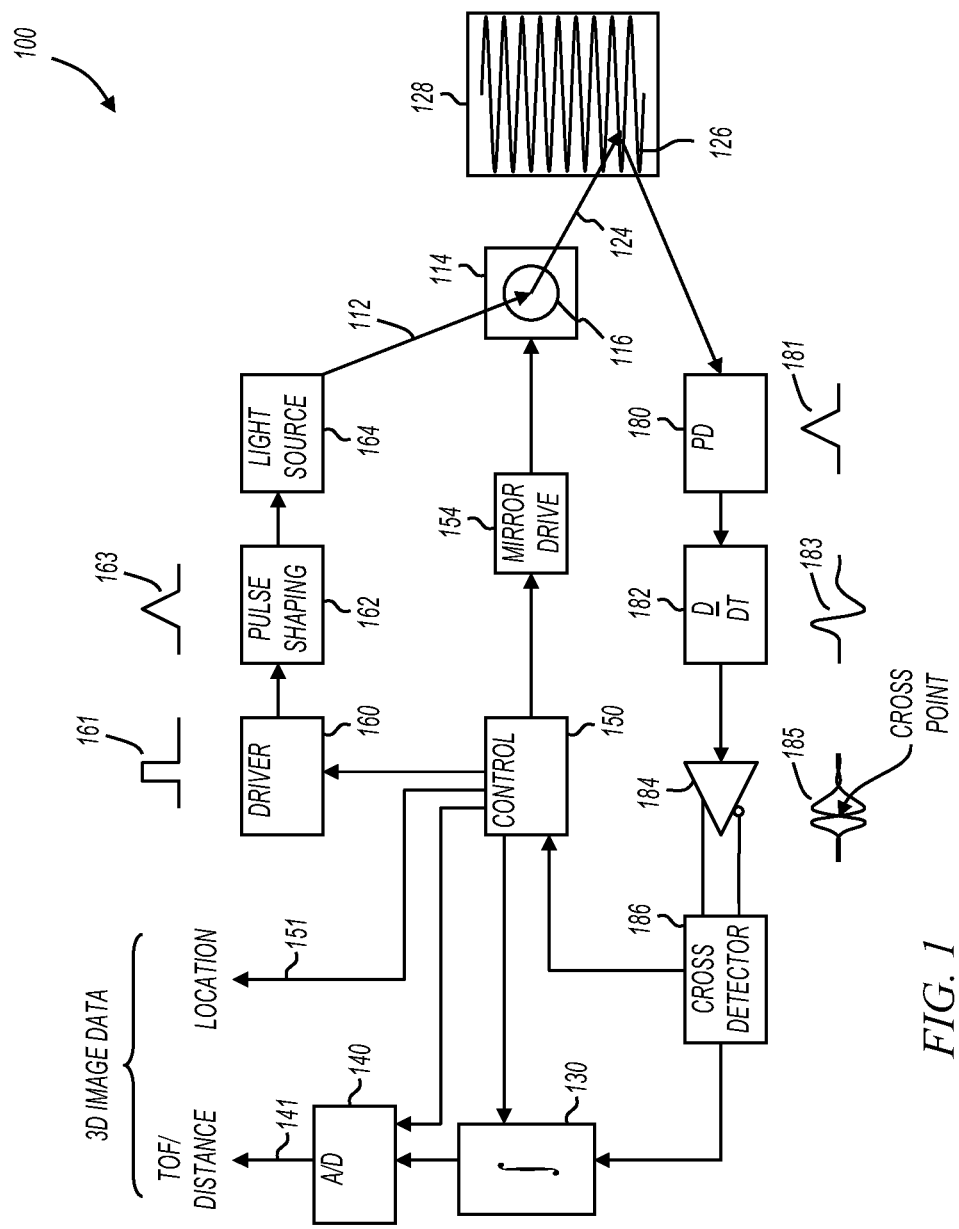
FIG. 1 shows a time of flight (TOF) distance measurement apparatus in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a time of flight (TOF) distance measurement apparatus in accordance with various embodiments of the present invention. As shown in FIG. 1, apparatus 100 includes a light source 164, which may be a laser light source such as a laser diode or the like, capable of emitting a laser beam 112. The beam 112 impinges on a scanning platform 114 which is part of a microelectromechanical system (MEMS) based scanner or the like, and reflects off of scanning mirror 116 to generate a controlled output beam 124. A scanning mirror drive circuit 154 provides one or more drive signal(s) to control the angular motion of scanning mirror 116 to cause output beam 124 to generate a raster scan 126 on a projection surface 128. In operation, light source 164 produces light pulses and scanning mirror 116 reflects the light pulses as beam 124 traverses raster pattern 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern.

Apparatus 100 also includes integrator 130, control circuit 150, driver 160, and pulse shaping circuit 162. Control circuit 150 commands driver 160 to create a pulse, and also commands integrator 130 to start an integration period. In some embodiments, control circuit 150 delays the start of the integration period to compensate for time delays within the system.

Driver 160 creates a pulse with a desired amplitude and pulse width, and pulse shaping circuit 162 shapes the pulse into a pulse with an abruptly changing amplitude shown at 163. The abruptly changing amplitude is useful for timing measurement as is further explained below. In some embodiments, pulse 163 is a triangle shaped pulse, and pulse shaping circuit 162 may create the triangle shaped pulse in any manner without departing from the scope of the present invention. For example, a series of resistor/capacitor (RC) circuits may be used to charge and discharge, thereby forming the triangle shaped pulse.

The light pulse created by light source 164 is reflected off scanning mirror 116 and is then reflected off projection surface 128. The reflected pulse is sensed at photodetector (PD) 180, as shown at 181. The reflected pulse may exhibit significant amplitude variations based on the distance to the projection surface 128, but the abrupt change in amplitude remains largely intact. Differentiator 182 then differentiates the reflected pulse and produces the differentiated pulse shown at 183. It is important to note that the point on pulse 181 corresponding to the abrupt change in amplitude (the peak of the triangle shaped pulse) now corresponds to the rapidly falling portion of the differentiated pulse 183.

Amplifier 184 receives the differentiated pulse 183 and produces a differential output shown at 185. The two differential output signals are shown superimposed on each other at 185, and the point at which they cross is referred to herein as the "cross point". Cross detector 186 receives the differential output signals shown at 185 and detects the timing of the cross point. In some embodiments, cross detector 186 includes a differential amplifier to perform the cross detection.

Cross detector 186 notifies control circuit 150 and integrator 130 when the cross point is detected. Control circuit 150 may reset and prepare to send another pulse, and integrator 130 may end the integration period based on the timing of the cross point. Analog-to-digital converter (A/D) 140 receives the output of integrator 130 and produces a digital signal on node 141 that corresponds to the time-of-flight (TOF) of the laser pulse, which in turn corresponds to the distance between apparatus 100 and projection surface 128.

In some embodiments, control circuit 150 also has knowledge of the position of scanning mirror 116, and therefore also has knowledge of the location in raster pattern 126 for which the distance has been measured. Control circuit 150 may output the location information at 151. The combination of location information at 151 and distance information at 141 provides a three-dimensional (3D) image of projection surface 128. Should an object exist in front of projection surface 128, then the combination of location information at 151 and distance information at 141 provides a 3D image of the object.

Control circuit 150 may influence the operation of scanning mirror control circuit 154 or may receive information regarding its operation. For example, in some embodiments, control circuit 150 may control the timing of light pulses produced by light source 164 as well as the timing of the raster pattern. In other embodiments, mirror drive circuit 154 controls the timing of the raster pattern, and control circuit 150 is provided this timing information.

Control circuit 150 may be implemented in hardware, software, or in any combination. For example, in some embodiments, control circuit 150 is implemented in an application specific integrated circuit (ASIC). Further, in some embodiments, some of the faster data path control is performed in an ASIC and overall control is software programmable.

In some embodiments, light source 164 sources nonvisible light such as infrared light. In these embodiments, PD 180 is able to detect the same wavelength of nonvisible light. For example, in some embodiments, light source 164 may be an infrared laser diode that produces light with a wavelength of substantially 808 nanometers (nm). In other embodiments, light source 164 sources visible light such as blue light. In these embodiments, PD 180 is able to detect the same visible light. For example, in some embodiments, light source 164 may be a blue laser diode that produces light with a wavelength of substantially 405 nanometers (nm). The wavelength of light is not a limitation of the present invention. Any wavelength, visible or nonvisible, may be used without departing from the scope of the present invention.

In some embodiments, mirror 116 scans in one dimension instead of two dimensions. This results in a raster pattern that scans back and forth on the same horizontal line. These embodiments can produce a 3D profile of an object where the horizontal line intersects the object. In other embodiments, mirror 116 is replaced by two mirrors, one scanning in one dimension, and a second scanning in a second dimension.

Apparatus 100 provides a robust TOF distance measurement system that is fairly insensitive to reflected pulse amplitude variations due to large variations in target distances and surface reflectivity. For example, the differentiated received light pulse exhibits a zero crossing in place of the peak amplitude of the received pulse. Regardless of the received amplitude, the zero crossing appears at substantially the same relative location within the light pulse, so accurate timing is maintained regardless of amplitude variations.

Many applications are contemplated for apparatus 100. For example, apparatus 100 may be used in a broad range of industrial robotic applications. For use in these applications, an infrared scanning embodiment may be used to rapidly gather 3D information within the proximity of the robotic arm. Based on distance measurements the robot is able to navigate to a desired position and or object and then to manipulate and move that object. Also for example, apparatus 100 may be used in gaming applications, such as in a game console or handheld controller. Still further examples include applications in surveillance and consumer displays.

Figure 2:
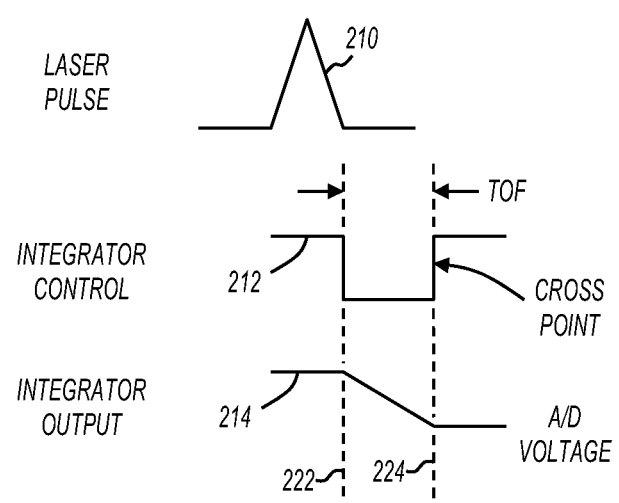
FIG. 2 shows a laser pulse and integrator operation in accordance with various embodiments of the present invention.

FIG. 2 shows a laser pulse and integrator operation in accordance with various embodiments of the present invention. Laser pulse 210 is an example of a laser pulse with an abrupt change in amplitude. Laser pulse 210 represents a pulse of light generated by light source 164 and reflected by scanning mirror 116. When laser pulse 210 is created, control circuit 150 modifies the integrator control signal 212 at time 222. In response to this control signal, integrator 130 begins an integration time.

In some embodiments, integrator 130 is an analog integrator that linearly modifies an output voltage during an integration time. One example integrator output voltage is shown at 214. After the falling edge of the integrator control signal at 222, the integrator output voltage begins to change. When cross detector 186 detects the cross point, control circuit 150 again modifies the integrator control signal as shown at time 224. In response, integrator 130 stops the integration and the integration time comes to an end. The voltage of integrator output 214 represents the laser pulse TOF. The A/D 140 digitizes this voltage, and the process can start over.

As shown in FIG. 2, control circuit 150 may start the integration sometime after laser pulse 210 is created. This compensates for time delay in the various circuits shown in FIG. 1. For example, differentiator 182 and amplifier 184 may exhibit a finite delay that can be compensated.

The rate at which pulses are created, reflected, and processed in the receive signal path may determine the horizontal spatial measurement resolution on raster pattern 126. For example, if pulses are created far apart in time, then measured points on raster pattern 126 may be further apart, and the horizontal spatial resolution will decrease. Also for example, if pulses are created closer in time, then the horizontal spatial resolution can increase. In some embodiments, horizontal spatial resolution is increased by panning the TOF distance measurement apparatus. See FIGS. 10 and 24.

Figure 3:
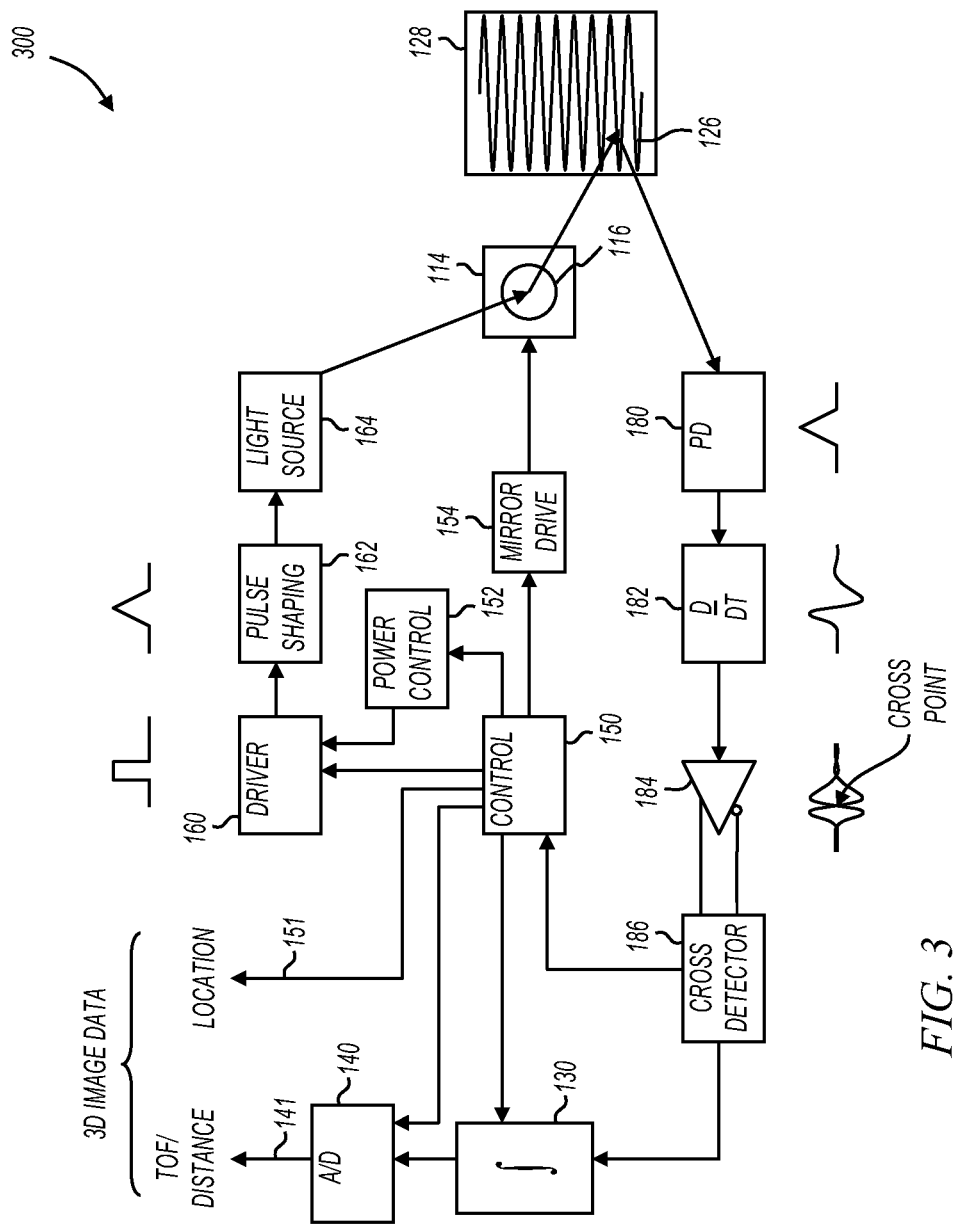
FIG. 3 shows a time of flight (TOF) distance measurement apparatus with power control in accordance with various embodiments of the present invention.

FIG. 3 shows a time of flight (TOF) distance measurement apparatus with power control in accordance with various embodiments of the present invention. Apparatus 300 includes all of the components shown in apparatus 100 (FIG. 1) with the addition of power control circuit 152. In operation, power control circuit 152 modifies the power of generated light pulses to avoid overdriving receive circuitry into non-linear operation. For example, when apparatus 300 is very close to surface 128, reflected pulses are received with a large amplitude, and without correction may saturate amplifier 184 and cause an error in the TOF measurement. The operation of apparatus 300 is described with reference to FIG. 4.

Figure 4:
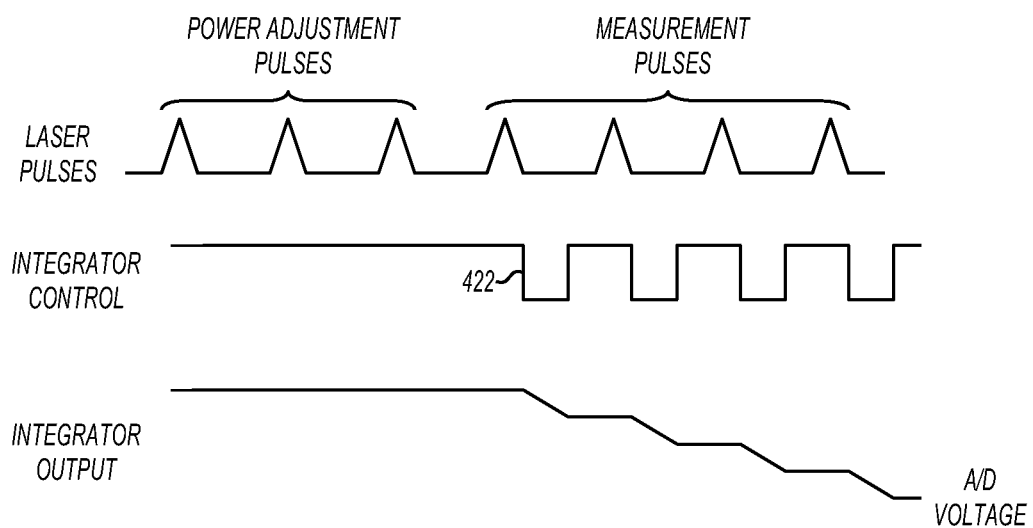
FIG. 4 shows a laser pulse train and integrator operation in accordance with various embodiments of the present invention.

FIG. 4 shows a laser pulse train and integrator operation in accordance with various embodiments of the present invention. FIG. 4 shows laser pulses, integrator control, and integrator output similar to FIG. 2, however, FIG. 4 shows at least one laser pulse in a "first pulse train" that is used to determine a correct laser pulse power before starting integration. A pulse train may also be referred to as a "melody." Three power adjustment pulses are shown in the first pulse train; however this is not a limitation of the present invention. For example, more or less than three power adjustment pulses may be present. Referring now back to FIG. 3, control circuit 150 may cause the power adjustment pulses to be created without starting the integration. When an appropriate pulse power is determined (or a fixed number of power adjustment pulses have been transmitted), then the integration is started as shown at 422.

In some embodiments, a single measurement pulse is used as shown in FIG. 2. In these embodiments, a first pulse train is used to adjust the output power, and then a single measurement pulse is used to determine TOF/distance. In other embodiments, multiple measurements pulses are included in a "second pulse train," and the integrator is started and stopped for each. In these embodiments, the resulting A/D voltage represents a multiple of the TOF/distance, and provides additional noise suppression.

The number of pulses in the first and second pulse trains may determine the horizontal spatial measurement resolution on raster pattern 126. For example, if many pulses are included in the pulse trains, then measured points on raster pattern 126 may be further apart, and the horizontal spatial resolution will decrease. Also for example, if fewer pulses are included in the pulse trains, then the horizontal spatial resolution can increase. In some embodiments, horizontal spatial resolution is increased by panning the TOF distance measurement apparatus. See FIGS. 10 and 24.

Figure 5:
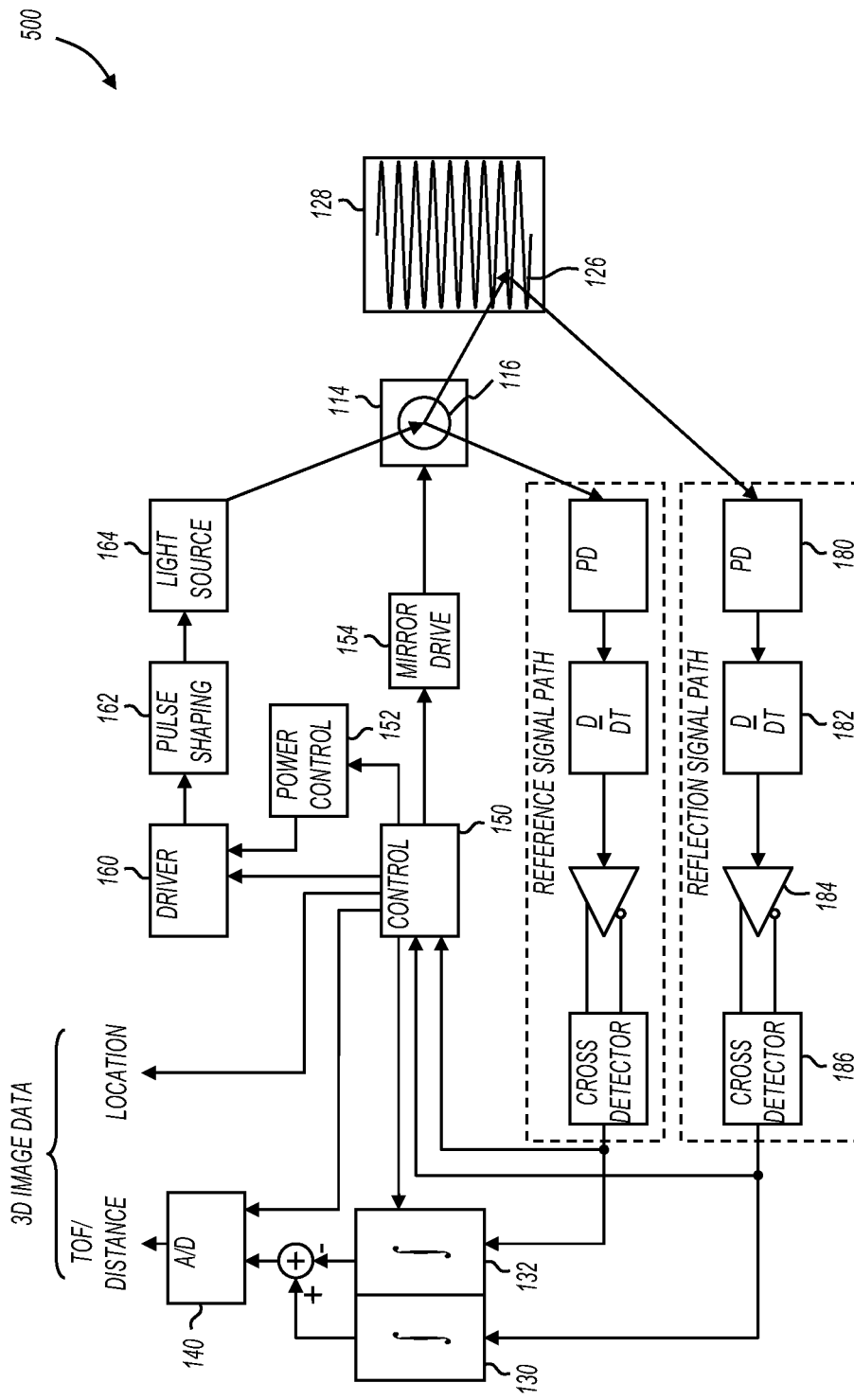
FIG. 5 shows a time of flight (TOF) distance measurement apparatus with power control and a reference signal path in accordance with various embodiments of the present invention.

FIG. 5 shows a time of flight (TOF) distance measurement apparatus with power control and a reference signal path in accordance with various embodiments of the present invention. Apparatus 500 includes all of the components shown in FIG. 3, where PD 180, differentiator 182, amplifier 184, and cross detector 186 are referred to as being in a "reflection signal path." This is because the signal being processed by these components has been reflected from surface 128. Apparatus 500 also includes a second integrator 132 and a "reference signal path" that includes circuits similar to those in the reflection path. The photodetector in the reference signal path detects the light pulse directly from scanning mirror 116 (or from light source 164). Because the circuits in the reference signal path and the reflection signal path are similar, the TOF is determined by the time difference between cross points in the two paths. This provides compensation for thermal circuit variations as well as other systematic errors in the measurement circuitry. The operation of apparatus 500 is described below with reference to FIG. 6.

Figure 6:
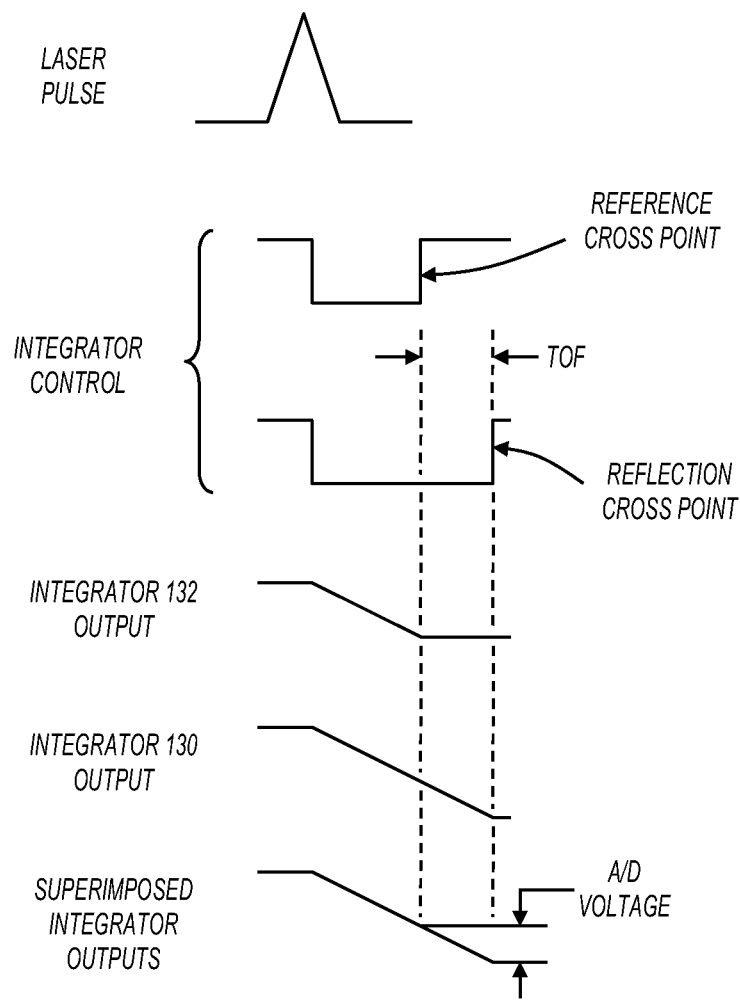
FIG. 6 shows a laser pulse and integrator operation in accordance with various embodiments of the present invention.

FIG. 6 shows a laser pulse and integrator operation in accordance with various embodiments of the present invention. As shown in FIG. 6, the time difference between the cross point in the reference path and the cross point in the reflection path represents the TOF/distance. The example of FIG. 6 shows a single laser pulse with no power adjustment pulses. In some embodiments, two pulse trains are included, where the first pulse train includes power adjustment pulses and the second pulse train includes measurement pulses as shown in FIG. 4. In embodiments represented by FIG. 6, both integrators 130 and 132 are started at the same time, sometime around when the laser pulse is created. Integrator 132 stops integrating when the reference cross point is detected, and integrator 130 stops integrating when the reflection cross point is detected. The difference between the two integrator outputs represents the TOF/distance. The combination of power control and a reference signal path further reduce distortion and increase the measurement accuracy.

Figure 7:
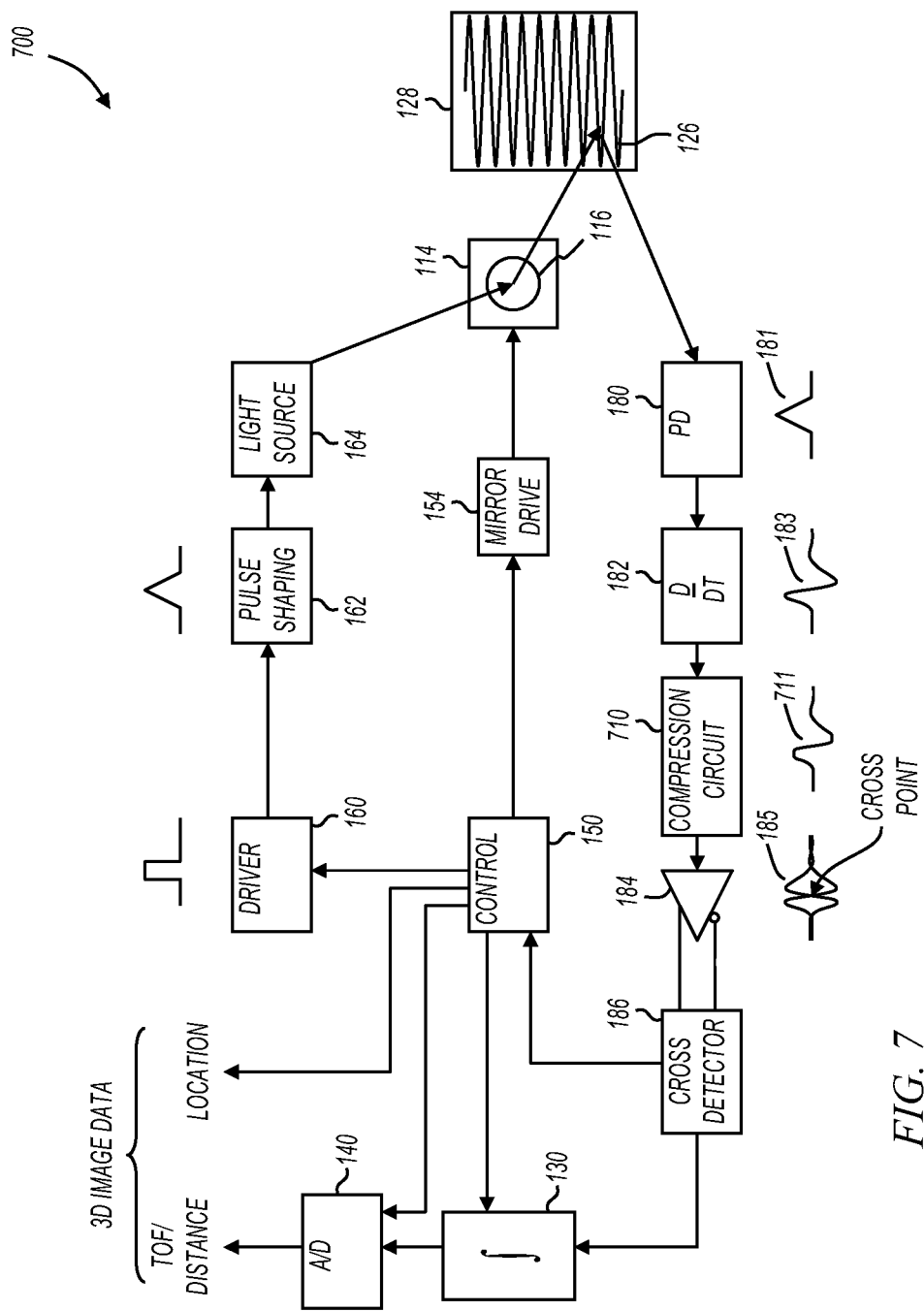
FIG. 7 shows a time of flight (TOF) distance measurement apparatus with a compression circuit in accordance with various embodiments of the present invention.

FIG. 7 shows a time of flight (TOF) distance measurement apparatus with a compression circuit in accordance with various embodiments of the present invention. Apparatus 700 includes all of the components shown in apparatus 100 (FIG. 1) with the addition of compression circuit 710. In operation, compression circuit 710 compresses the amplitude of the differentiated pulse 183. A compressed pulse is shown at 711.

Compressing the signal reduces the amplitude prior to amplification to avoid saturating circuits on the receive side. For example, when apparatus 700 is very close to surface 128, reflected pulses are received with a large amplitude, and without compression, the received pulses may saturate amplifier 184 and cause measurement error. Compression circuit 710 may perform logarithmic compression, hard clipping, soft clipping, or programmable clipping. The manner in which signals are compressed is not a limitation of the present invention.

In operation, single pulse measurements can be made with a high dynamic range (allowing short and long distance measurements) by compressing the differentiated pulse.

Because the cross detect operation is not sensitive to the amplitude of the differentiated pulse, the signal can be compressed without compromising TOF accuracy.

The rate at which pulses are created, reflected, and processed in the receive signal path may determine the horizontal spatial measurement resolution on raster pattern 126. For example, if pulses are created far apart in time, then measured points on raster pattern 126 may be further apart, and the horizontal spatial resolution will decrease. Also for example, if pulses are created closer in time, then the horizontal spatial resolution can increase. In some embodiments, horizontal spatial resolution is increased by panning the TOF distance measurement apparatus. See FIGS. 10 and 24.

Figure 8:
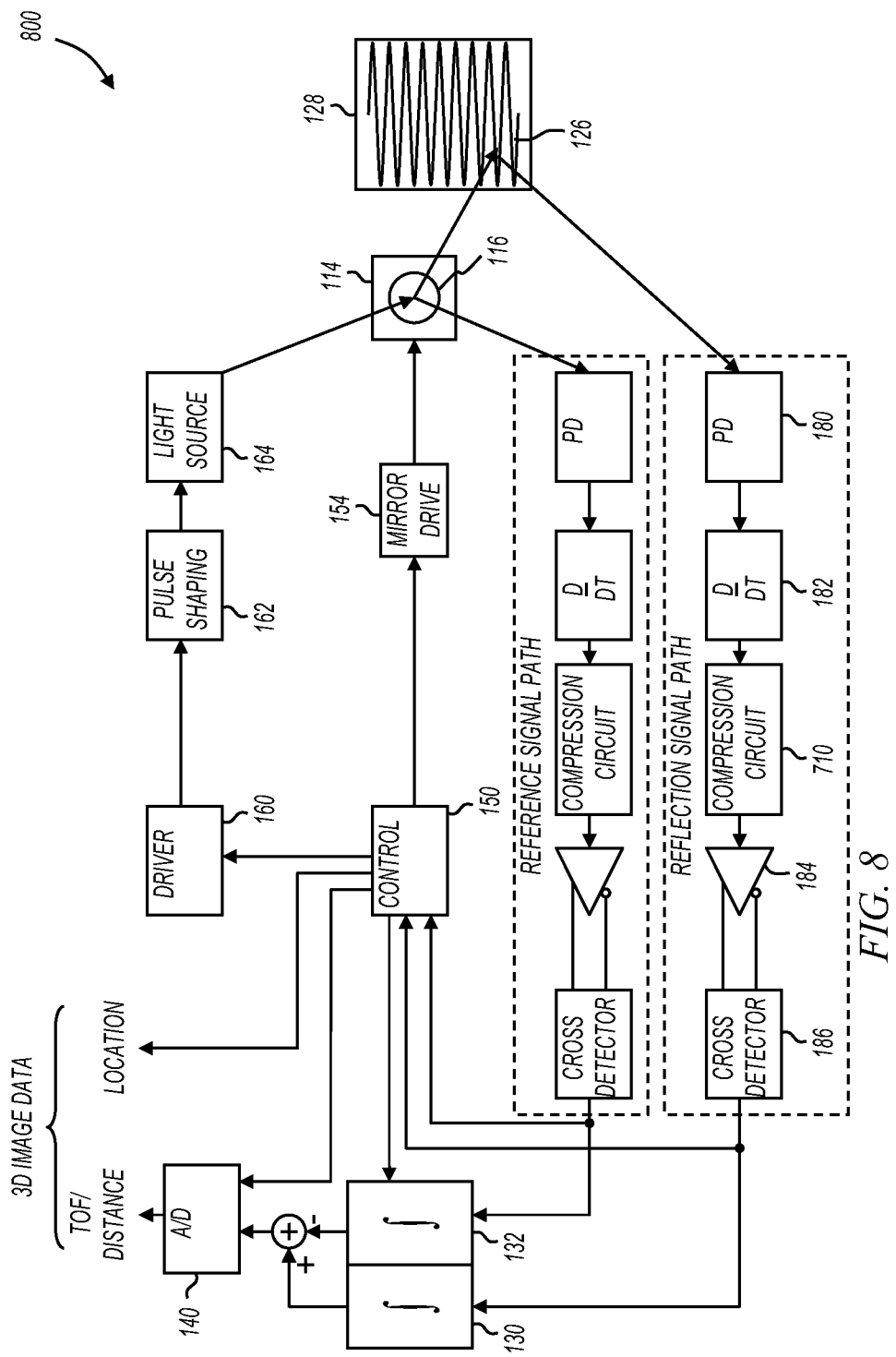
FIG. 8 shows a time of flight (TOF) distance measurement apparatus with a compression circuit and reference signal path in accordance with various embodiments of the present invention.

FIG. 8 shows a time of flight (TOF) distance measurement apparatus with a compression circuit and reference signal path in accordance with various embodiments of the present invention. Apparatus 800 includes all of the components shown in FIG. 7, where PD 180, differentiator 182, compression circuit 710, amplifier 184, and cross detector 186 are referred to as being in a "reflection signal path." This is because the signal being processed by these components has been reflected from surface 128. Apparatus 800 also includes a second integrator 132, and a "reference signal path" that includes circuits similar to those in the reflection path. The photodetector in the reference signal path detects the light pulse directly from scanning mirror 116 (or from light source 164). Because the circuits in the reference signal path and the reflection signal path are similar, the TOF is determined by the time difference between cross points in the two paths. This provides compensation for thermal circuit variations. The operation of apparatus 800 is shown in FIG. 6. As shown in FIG. 6, the time difference between the cross point in the reference path and the cross point in the reflection path represents the TOF/distance. The combination of signal compression and a reference signal path further reduce distortion and increase signal path fidelity.

Figure 9:
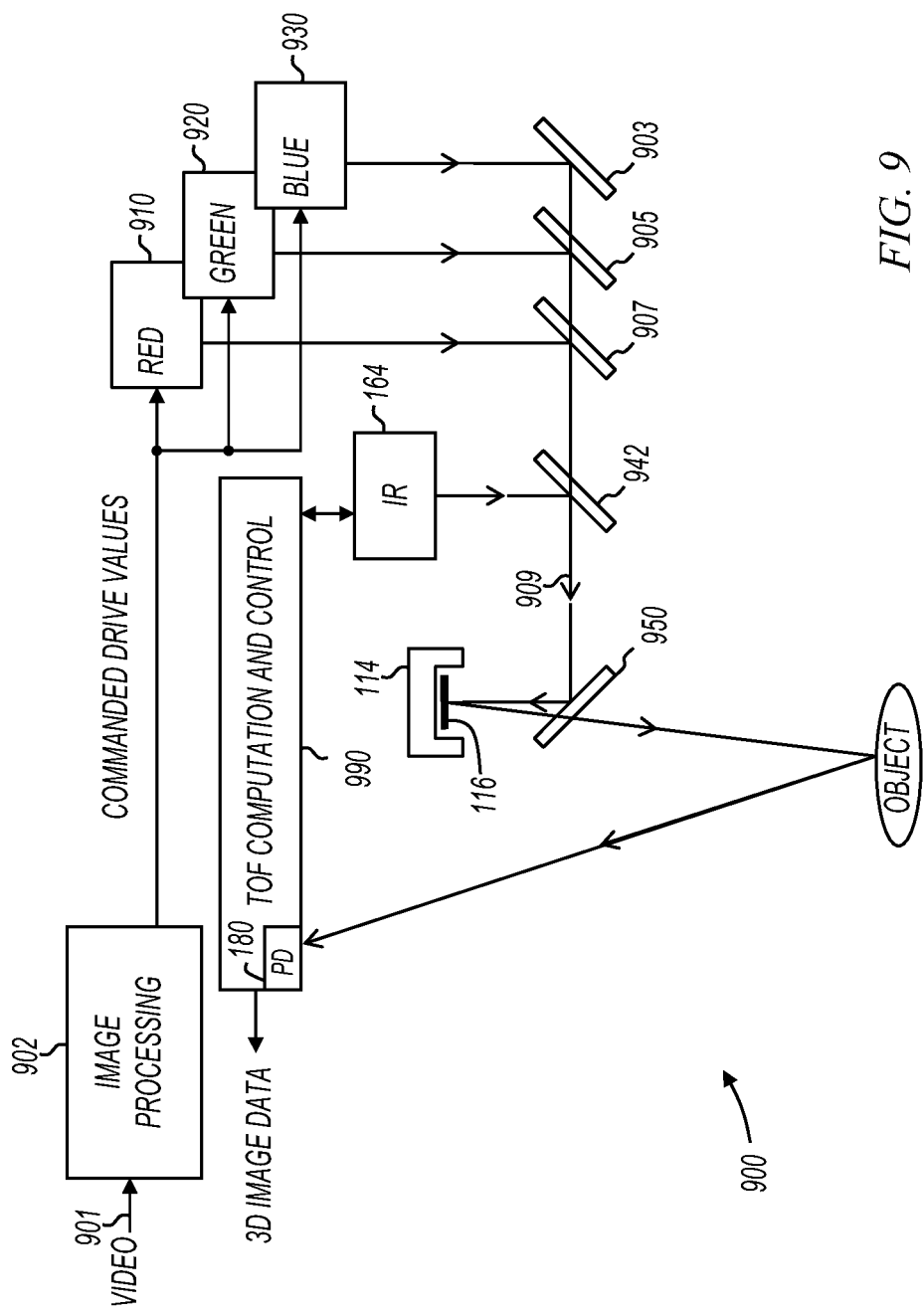
FIG. 9 shows a 3D imaging device in accordance with various embodiments of the present invention.

FIG. 9 shows a 3D imaging device in accordance with various embodiments of the present invention. 3D imaging device 900 combines a projector with 3D imaging capabilities. The system receives and displays video content in red, green, and blue, and uses infrared light for 3D imaging.

3D imaging device 900 includes image processing component 902, TOF computation and control component 990, red laser module 910, green laser module 920, blue laser module 930, and infrared laser module 164. Light from the laser modules is combined with mirrors 903, 905, 907, and 942. 3D imaging device 900 also includes fold mirror 950, and scanning platform 114 with scanning mirror 116.

In operation, image processing component 902 processes video content at 901 using two dimensional interpolation algorithms to determine the appropriate spatial image content for each scan position. This content is then mapped to a commanded current for each of the red, green, and blue laser sources such that the output intensity from the lasers is consistent with the input image content. In some embodiments, this process occurs at output pixel speeds in excess of 150 MHz.

The laser beams are then directed onto an ultra-high speed gimbal mounted 2 dimensional bi-axial laser scanning mirror 116. In some embodiments, this bi-axial scanning mirror is fabricated from silicon using MEMS processes. The vertical axis of rotation is operated quasi-statically and creates a vertical sawtooth raster trajectory. The horizontal axis is operated on a resonant vibrational mode of the scanning mirror. In some embodiments, the MEMS device uses electromagnetic actuation, achieved using a miniature assembly containing the MEMS die, small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

Embodiments represented by FIG. 9 combine the video projection described in the previous paragraph with IR laser module 164, and TOF computation and control component 990 for 3D imaging of the projection surface. TOF computation and control component 990 includes components to create a laser pulse with an abrupt change in amplitude, and also includes a reflection signal path and optionally also includes a reference signal path. For example, in some embodiments, TOF computation and control component 990 includes control component 150, driver 160, pulse shaping circuit 162, PD 180, differentiator 182, amplifier 184, cross detector 186, integrator 130, and A/D 140. Further, in some embodiments, TOF computation and control component may include power control circuit 152 (FIGS. 3, 5) and/or compression circuit 710 (FIGS. 7, 8).

The IR laser 164 may be used to invisibly probe the environment with programmable spatial and temporal content at line rates related to the scan frequency of mirror 116. In some embodiments this may be in excess of 54 kHz (scanning both directions at 27 kHz). TOF computation and control component 990 receives the reflected laser pulse and produces 3D image data as described above with reference to previous figures. These images can be downloaded at kHz rates. Processing of these images provides ultra-high speed 3D depth information. For example, the entire field of view may be surveyed in 3D within a single video frame, which in some embodiments may be within ⅟₆₀th of a second. In this way a very high speed 3D camera results that exceeds the speed of currently available 3D imaging devices by an order of magnitude.

Many applications are contemplated for 3D imaging device 900. For example, the scanned infrared beam may be used to probe the projection display field for hand gestures. These gestures are then used to interact with the computer that controls the display. Applications such as 2D and 3D touch screen technologies are supported. In some embodiments, the 3D imaging is used to determine the topography of the projection surface, and image processing component 902 pre-distorts the video image to provide a non-distorted displayed image on nonuniform projection surfaces.

Figure 10:
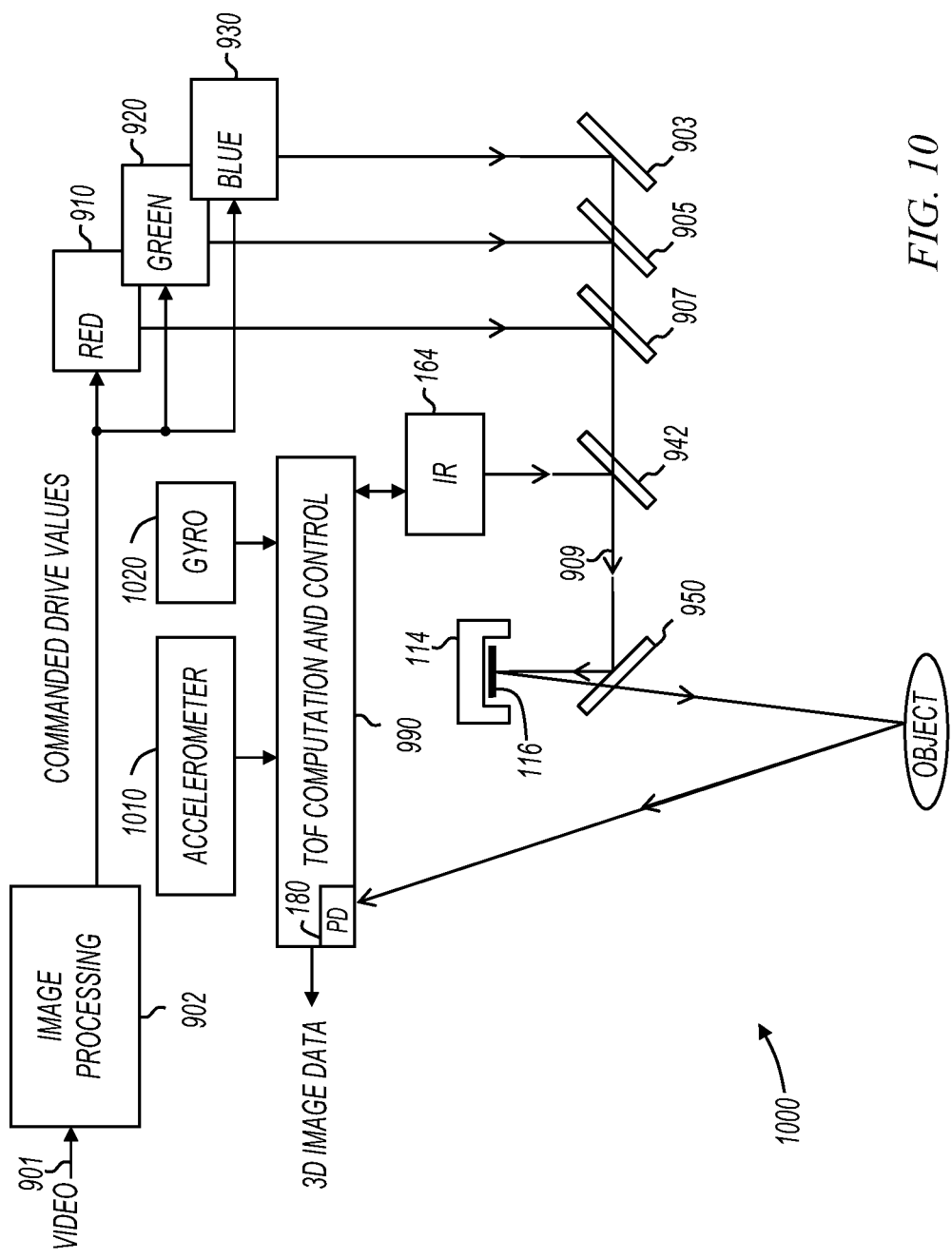
FIG. 10 shows a 3D imaging device with motion sensing devices in accordance with various embodiments of the present invention.

FIG. 10 shows a 3D imaging device with motion sensing devices in accordance with various embodiments of the present invention. 3D imaging device 1000 includes all of the components shown in 3D imaging device 900 (FIG. 9) with the addition of accelerometer 1010 and gyroscope 1020.

Gyroscope 1020 determines the orientation of 3D imaging device 1000, and accelerometer 1010 detects motion of 3D imaging device 1000. When 3D imaging device 1000 is panned horizontally, different points on the target object are illuminated by the IR laser pulses, and so 3D image data is collected for different points on the object. By panning and recording movement, higher spatial resolution may be achieved.

Figure 11:
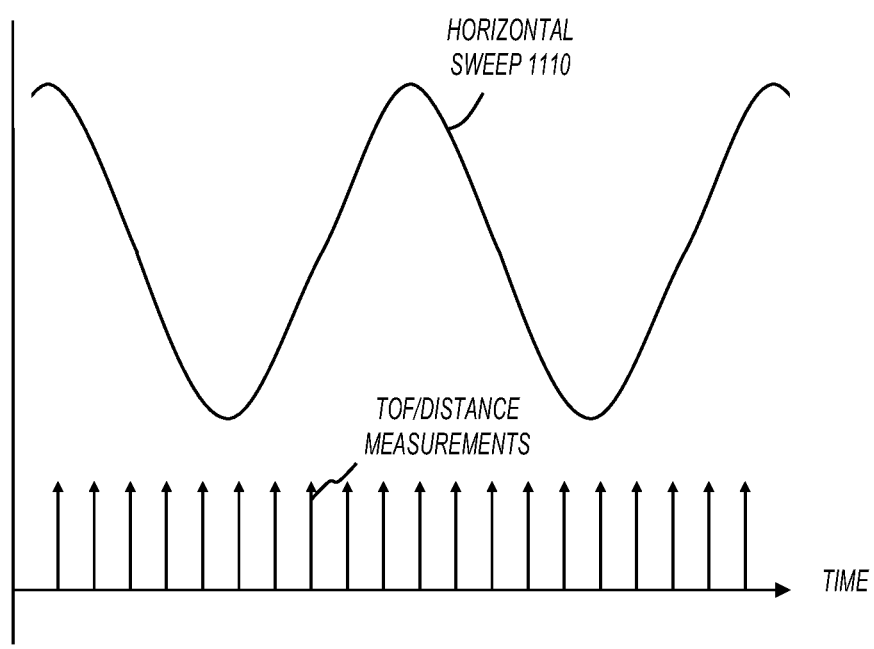
FIG. 11 shows timing of distance measures in a 3D imaging device in accordance with various embodiments of the present invention.

FIG. 11 shows timing of distance measures in a 3D imaging device in accordance with various embodiments of the present invention. The waveforms shown in FIG. 11 demonstrate how higher spatial resolution may be achieved by panning a 3D imaging device that includes motion sensing devices.

In the example of FIG. 11, five distance measurements are shown for each horizontal sweep 1110. If there are 480 horizontal sweeps, then this corresponds to a spatial resolution of 5×480, where five is in the horizontal direction and 480 is in the vertical direction.

In some embodiments, the device is panned horizontally while distance measurements are made at fixed points in the horizontal sweep. This results in distance measurements at different points on the target device. Information from accelerometer 1010 and gyroscope 1020 are used to determine the points on the object that are being measured, and this results in higher horizontal spatial resolution.

The horizontal resolution may be arbitrarily high based on the speed of panning and the amount of data collected. In some embodiments, a fixed 3D image resolution is created by selecting points from the oversampled field, or by interpolating between points that were collected.

Figure 12:
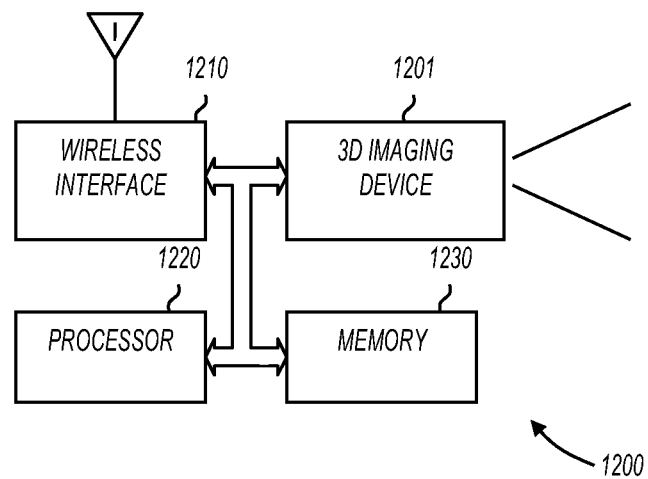
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and 3D imaging device 1201. 3D imaging device 1201 creates a 3D image by measuring the TOF of laser pulses as described above. 3D imaging device 1201 may include differentiators and cross detectors as described herein. 3D imaging device 1201 may also include power control circuits and/or compression circuits as described herein. For example, 3D imaging device 1201 may include any of apparatus 100 (FIG. 1), apparatus 300 (FIG. 3), apparatus 700 (FIG. 7), or apparatus 800 (FIG. 8). 3D imaging device 1201 may use multiple pulse trains to perform a single distance measurement, or may use one laser pulse for a single measurement.

In some embodiments, 3D imaging device 1201 also includes a scanning projector. For example, 3D imaging device 1201 may include 3D imaging device 900 (FIG. 9) or 3D imaging device 1000 (FIG. 10). In these embodiments, 3D imaging device 1201 may receive image data from any image source. For example, in some embodiments, 3D imaging device 1201 includes memory that holds still images. In other embodiments, 3D imaging device 1201 includes memory that includes video images. In still further embodiments, 3D imaging device 1201 displays imagery received from external sources such as connectors, wireless interface 1210, a wired interface, or the like.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 provides image or video data to 3D imaging device 1201. The image or video data may be retrieved from wireless interface 1210 or may be derived from data retrieved from wireless interface 1210. For example, through processor 1220, 3D imaging device 1201 may display images or video received directly from wireless interface 1210. Also for example, processor 1220 may provide overlays to add to images and/or video received from wireless interface 1210, or may alter stored imagery based on data received from wireless interface 1210 (e.g., modifying a map display in GPS embodiments in which wireless interface 1210 provides location coordinates).

Figure 13:
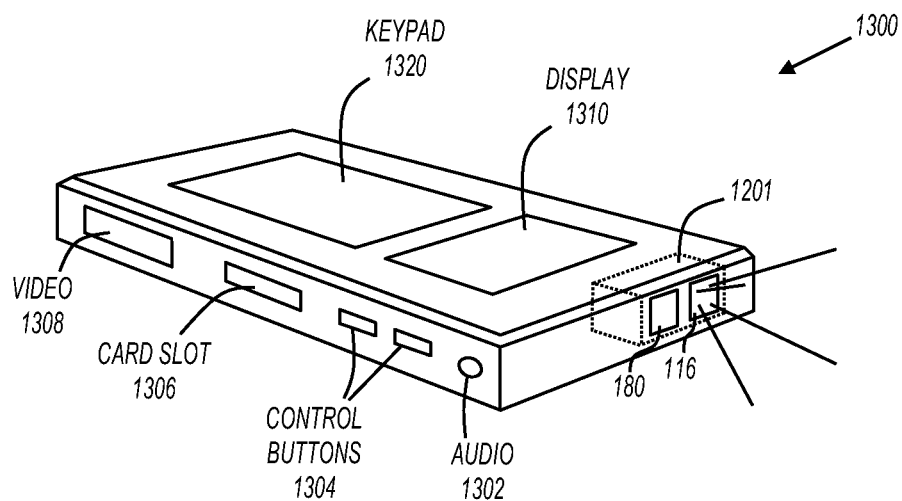
FIG. 13 shows a mobile device in accordance with various embodiments of the present invention.

FIG. 13 shows a mobile device in accordance with various embodiments of the present invention. Mobile device 1300 may be a hand held 3D imaging device with or without communications ability. For example, in some embodiments, mobile device 1300 may be a 3D imaging device with little or no other capabilities. Also for example, in some embodiments, mobile device 1300 may be a device usable for communications, including for example, a cellular phone, a smart phone, a personal digital assistant (PDA), a global positioning system (GPS) receiver, or the like. Further, mobile device 1300 may be connected to a larger network via a wireless (e.g., WiMax) or cellular connection, or this device can accept and/or transmit data messages or video content via an unregulated spectrum (e.g., WiFi) connection.

Mobile device 1300 includes 3D imaging device 1201 to create 3D images. 3D imaging device 1201 may be any of the 3D imaging devices described herein. 3D imaging device 1201 is shown including scanning mirror 116 and PD 180. Mobile device 1300 also includes many other types of circuitry; however, they are intentionally omitted from FIG. 13 for clarity.

Mobile device 1300 includes display 1310, keypad 1320, audio port 1302, control buttons 1304, card slot 1306, and audio/video (A/V) port 1308. None of these elements are essential. For example, mobile device 1300 may only include 3D imaging device 1201 without any of display 1310, keypad 1320, audio port 1302, control buttons 1304, card slot 1306, or A/V port 1308. Some embodiments include a subset of these elements. For example, an accessory projector product that includes 3D imaging capabilities may include 3D imaging device 1000 (FIG. 10), control buttons 1304 and A/V port 1308.

Display 1310 may be any type of display. For example, in some embodiments, display 1310 includes a liquid crystal display (LCD) screen. Display 1310 may or may not always display the image captured by 3D imaging device 1201. For example, an accessory product may always display the captured image, whereas a mobile phone embodiment may capture an image while displaying different content on display 1310. Keypad 1320 may be a phone keypad or any other type of keypad.

A/V port 1308 accepts and/or transmits video and/or audio signals. For example, A/V port 1308 may be a digital port, such as a high definition multimedia interface (HDMI) interface that accepts a cable suitable to carry digital audio and video data. Further, A/V port 1308 may include RCA jacks to accept or transmit composite inputs. Still further, A/V port 1308 may include a VGA connector to accept or transmit analog video signals. In some embodiments, mobile device 1300 may be tethered to an external signal source through A/V port 1308, and mobile device 1300 may project content accepted through A/V port 1308. In other embodiments, mobile device 1300 may be an originator of content, and A/V port 1308 is used to transmit content to a different device.

Audio port 1302 provides audio signals. For example, in some embodiments, mobile device 1300 is a 3D media recorder that can record and play audio and 3D video. In these embodiments, the video may be projected by 3D imaging device 1201 and the audio may be output at audio port 1302.

Mobile device 1300 also includes card slot 1306. In some embodiments, a memory card inserted in card slot 1306 may provide a source for audio to be output at audio port 1302 and/or video data to be projected by 3D imaging device 1201. In other embodiments, a memory card inserted in card slot 1306 may be used to store 3D image data captured by mobile device 1300. Card slot 1306 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 14:
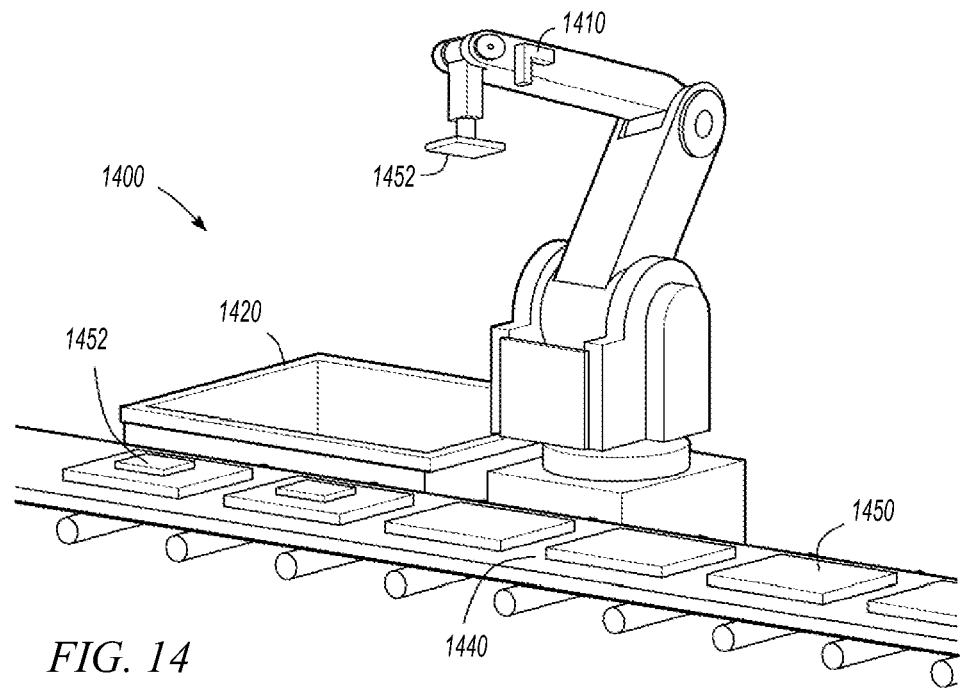
FIGS. 14 and 15 show robotic vision systems in accordance with various embodiments of the invention.
Figure 15:
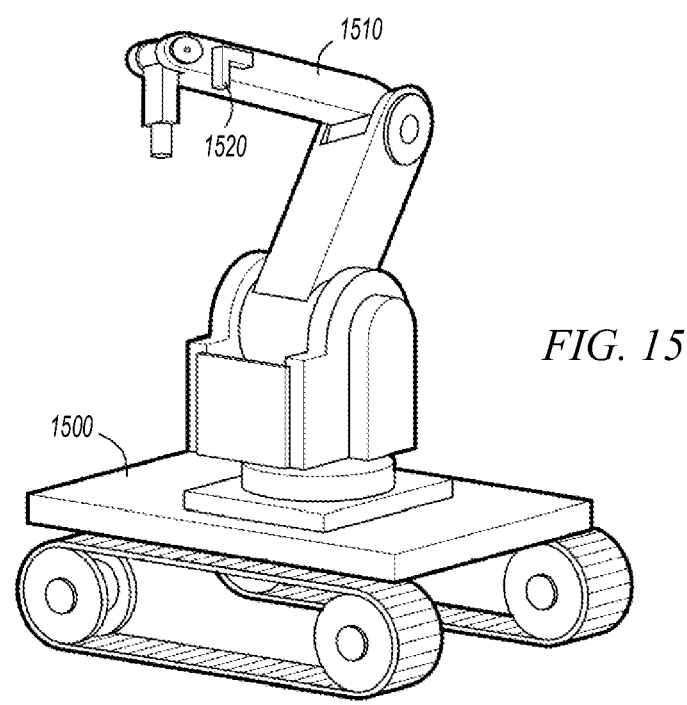

FIGS. 14 and 15 show robotic vision systems in accordance with various embodiments of the invention. The robotic system 1400 of FIG. 14 includes robotic arm 1430 and 3D imaging device 1410. 3D imaging device 1410 creates a 3D image by measuring the TOF of laser pulses as described above. 3D imaging device 1410 may include differentiators and cross detectors as described herein. 3D imaging device 1410 may also include power control circuits and/or compression circuits as described herein. For example, 3D imaging device 1410 may include any of apparatus 100 (FIG. 1), apparatus 300 (FIG. 3), apparatus 700 (FIG. 7), or apparatus 800 (FIG. 8). 3D imaging device 1210 may use multiple pulse trains to perform a single distance measurement, or may use one laser pulse for a single measurement. In some embodiments, 3D imaging device 1410 also includes a scanning projector. For example, 3D imaging device 1410 may include 3D imaging device 900 (FIG. 9) or 3D imaging device 1000 (FIG. 10).

In the example of FIG. 14, the robotic system is picking parts 1452 from parts bin 1420 and placing them on assemblies 1450 on assembly line 1440. In some embodiments, 3D imaging device 1410 performs 3D imaging of parts within parts bin 1420 and then performs 3D imaging of assemblies 1450 while placing parts.

The robotic system 1500 of FIG. 15 includes a vehicular robot with robotic arm 1510 and 3D imaging device 1520. 3D imaging device 1520 creates a 3D image by measuring the TOF of laser pulses as described above. 3D imaging device 1520 may include differentiators and cross detectors as described herein. 3D imaging device 1520 may also include power control circuits and/or compression circuits as described herein. For example, 3D imaging device 1520 may include any of apparatus 100 (FIG. 1), apparatus 300 (FIG. 3), apparatus 700 (FIG. 7), or apparatus 800 (FIG. 8). 3D imaging device 1520 may use multiple pulse trains to perform a single distance measurement, or may use one laser pulse for a single measurement. In some embodiments, 3D imaging device 1520 also includes a scanning projector. For example, 3D imaging device 1520 may include 3D imaging device 900 (FIG. 9) or 3D imaging device 1000 (FIG. 10). In the example of FIG. 15, the robotic system is able to maneuver based on its perceived 3D environment.

Figure 16:
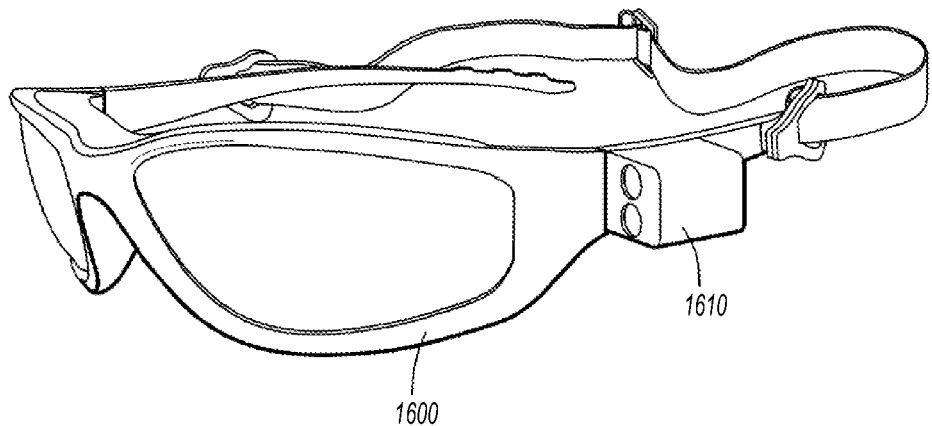
FIG. 16 shows a wearable 3D imaging system in accordance with various embodiments of the invention.

FIG. 16 shows a wearable 3D imaging system in accordance with various embodiments of the invention. In the example of FIG. 16, the wearable 3D imaging system 1600 is in the form of eyeglasses, but this is not a limitation of the present invention. For example, the wearable 3D imaging system may be a hat, headgear, worn on the arm or wrist, or be incorporated in clothing. The wearable 3D imaging system 1600 may take any form without departing from the scope of the present invention.

Wearable 3D imaging system 1600 includes 3D imaging device 1610. 3D imaging device 1610 creates a 3D image by measuring the TOF of laser pulses as described above. 3D imaging device 1610 may include differentiators and cross detectors as described herein. 3D imaging device 1610 may also include power control circuits and/or compression circuits as described herein. For example, 3D imaging device 1610 may include any of apparatus 100 (FIG. 1), apparatus 300 (FIG. 3), apparatus 700 (FIG. 7), or apparatus 800 (FIG. 8). 3D imaging device 1610 may use multiple pulse trains to perform a single distance measurement, or may use one laser pulse for a single measurement. In some embodiments, 3D imaging device 1610 also includes a scanning projector. For example, 3D imaging device 1610 may include 3D imaging device 900 (FIG. 9) or 3D imaging device 1000 (FIG. 10).

In some embodiments, wearable 3D imaging system 1600 provides feedback to the user that is wearing the system. For example, a head up display may be incorporate to overlay 3D images with data to create an augmented reality. Further, tactile feedback may be incorporated in the wearable 3D imaging device to provide interaction with the user.

Figure 17:
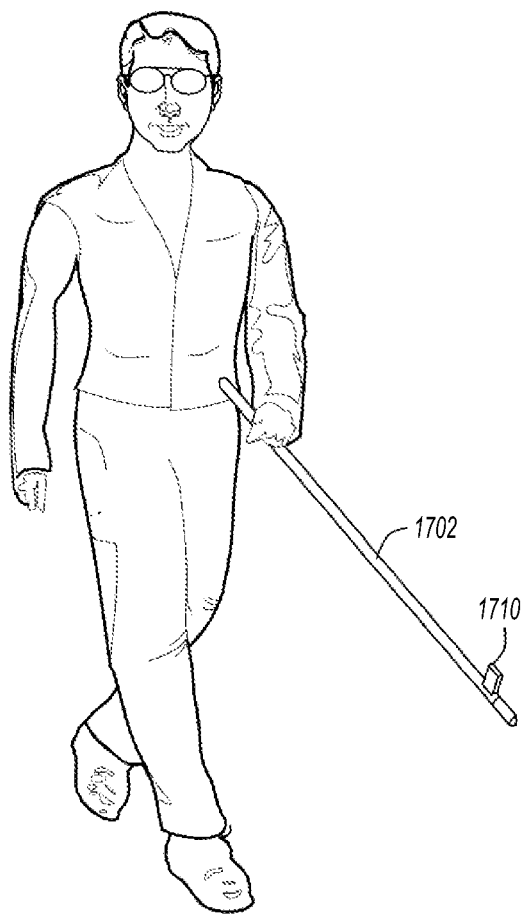
FIG. 17 shows a cane with a 3D imaging system in accordance with various embodiments of the invention.

FIG. 17 shows a cane with a 3D imaging system in accordance with various embodiments of the invention. Cane 1702 includes 3D imaging device 1710. 3D imaging device 1710 creates a 3D image by measuring the TOF of laser pulses as described above. 3D imaging device 1710 may include differentiators and cross detectors as described herein. 3D imaging device 1710 may also include power control circuits and/or compression circuits as described herein. For example, 3D imaging device 1710 may include any of apparatus 100 (FIG. 1), apparatus 300 (FIG. 3), apparatus 700 (FIG. 7), or apparatus 800 (FIG. 8). 3D imaging device 1710 may use multiple pulse trains to perform a single distance measurement, or may use one laser pulse for a single measurement. In some embodiments, 3D imaging device 1710 also includes a scanning projector. For example, 3D imaging device 1710 may include 3D imaging device 900 (FIG. 9) or 3D imaging device 1000 (FIG. 10).

In the example of FIG. 17, the cane is able to take 3D images of the surrounding environment. For example, cane 1700 may be able to detect obstructions (such as a curb or fence) in the path of the person holding the cane.

Feedback mechanisms may also be incorporated in the cane to provide interaction with the user. For example, tactile feedback may be provided through the handle. Also for example, audio feedback may be provided. Any type of user interface may be incorporated in cane 1700 without departing from the scope of the present invention.

Figure 18:
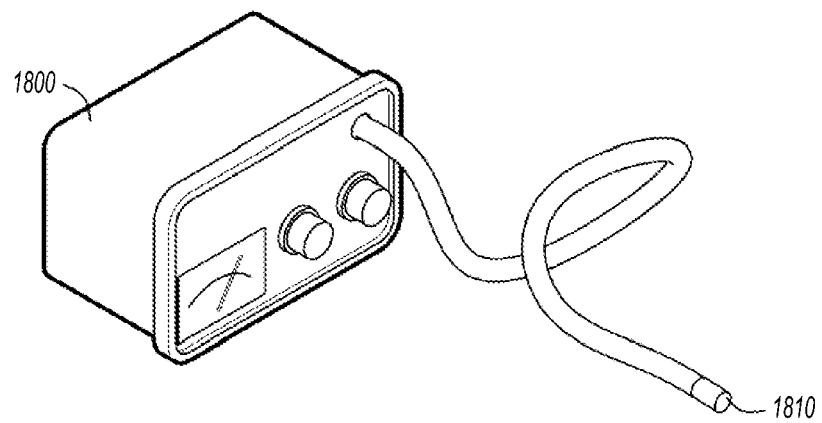
FIGS. 18 and 19 show medical systems with 3D imaging devices in accordance with various embodiments of the present invention.
Figure 19:
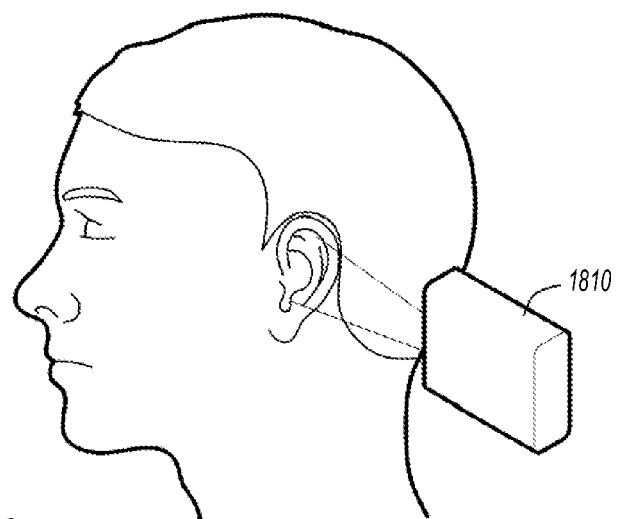

FIGS. 18 and 19 show medical systems with 3D imaging devices in accordance with various embodiments of the present invention. FIG. 18 shows medical system 1800 with 3D imaging device 1810 at the end of a flexible member. 3D imaging device 1810 creates a 3D image by measuring the TOF of laser pulses as described above. 3D imaging device 1810 may include differentiators and cross detectors as described herein. 3D imaging device 1810 may also include power control circuits and/or compression circuits as described herein. For example, 3D imaging device 1810 may include any of apparatus 100 (FIG. 1), apparatus 300 (FIG. 3), apparatus 700 (FIG. 7), or apparatus 800 (FIG. 8). 3D imaging device 1810 may use multiple pulse trains to perform a single distance measurement, or may use one laser pulse for a single measurement. In some embodiments, 3D imaging device 1810 also includes a scanning projector. For example, 3D imaging device 1810 may include 3D imaging device 900 (FIG. 9) or 3D imaging device 1000 (FIG. 10).

In the example of FIG. 18, medical equipment 1800 may be useful for any medical purpose, including oncology, laparoscopy, gastroenterology, or the like.

Medical equipment 1800 may be used for any purpose without departing from the scope of the present invention. For example, FIG. 19 shows 3D imaging device 1810 taking a 3D image of an ear. This may be useful for fitting a hearing aid, or for diagnosing problems in the ear canal. Because 3D imaging device 1810 can be made very small, imaging of the ear canal's interior is made possible.

Figure 20:
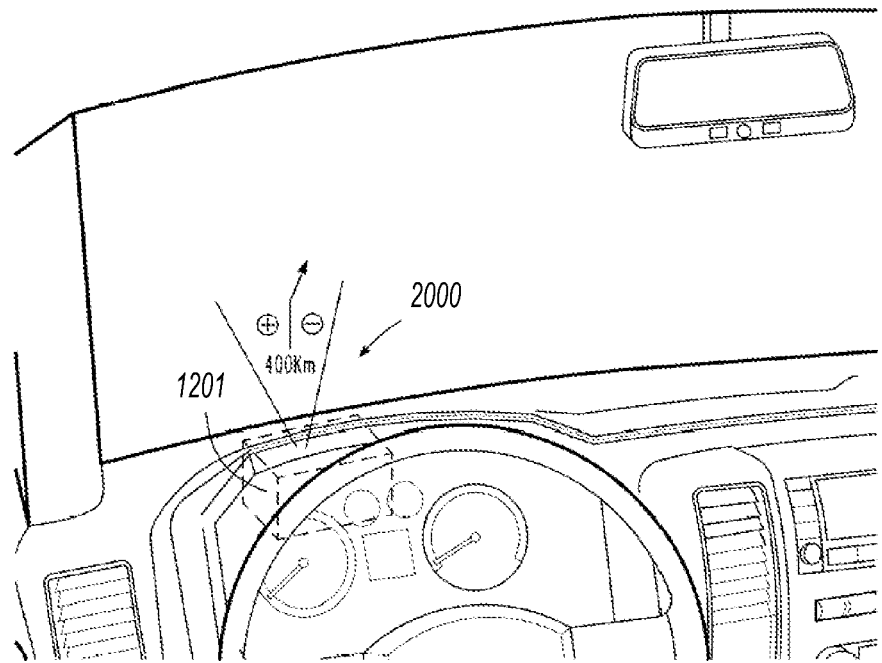
FIG. 20 shows a head-up display system in accordance with various embodiments of the invention.

FIG. 20 shows a head-up display system in accordance with various embodiments of the invention. Head-up display system 2000 includes 3D imaging system 1201 to display information on the windshield. In some embodiments, 3D imaging system 1201 also creates a 3D image of the display surface (in this example, the windshield), and uses this information for any purpose. For example, in some embodiments, 3D imaging device 1201 determines the contour of the display surface and warps the displayed image to compensate. In this manner, an aftermarket head-up display may be mounted in any vehicle with any display surface contour without distortion.

Although an automotive head-up display is shown in FIG. 20, this is not a limitation of the present invention. For example, various embodiments of the invention include head-up displays in avionics application, air traffic control applications, and other applications.

Figure 21:
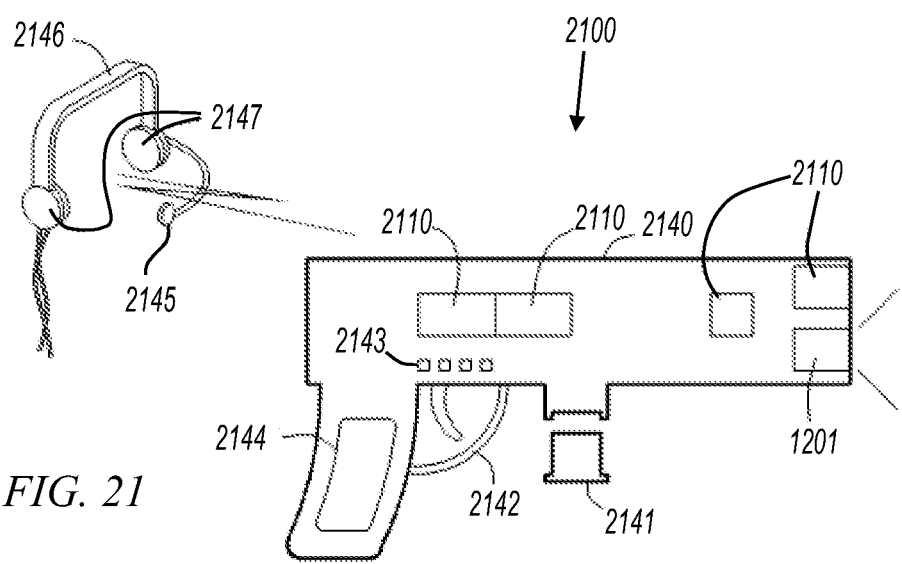
FIG. 21 shows a gaming apparatus in accordance with various embodiments of the present invention.

FIG. 21 shows a gaming apparatus in accordance with various embodiments of the present invention. Gaming apparatus 2100 allows a user or users to observe and interact with a gaming environment. The game is navigated based on the motion, position, or orientation of gaming apparatus 2100, an apparatus that includes 3D imaging device 1201. In some embodiments, the game environment is modified based on 3D image data gathered by 3D imaging device 1201. For example, the game display may be modified based on the contour of the display surface. An augmented reality game may determine the presence of a particular surface contour (e.g., a statue), and overlay a projected display to create an augmented reality environment.

Other control interfaces, such as manually-operated buttons, foot pedals, or verbal commands, may also contribute to navigation around, or interaction with the gaming environment. For example, in some embodiments, trigger 2142 contributes to the illusion that the user or users are in a first person perspective video game environment, commonly known as a "first person shooter game." Because the size and brightness of the projected display can be controlled by the gaming application in combination with the user's movement, gaming apparatus 2100 creates a highly believable or "immersive" environment for these users.

Many other first person perspective simulations can also be created by gaming apparatus 2100, for such activities as 3D seismic geo-prospecting, spacewalk planning, jungle canopy exploration, automobile safety instruction, medical education, etc. Tactile interface 2144 may provide a variety of output signals, such as recoil, vibration, shake, rumble, etc. Tactile interface 2144 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 2100 may also include audio output devices, such as integrated audio speakers, remote speakers, or headphones. These sorts of audio output devices may be connected to gaming apparatus 2100 with wires or through a wireless technology. For example, wireless headphones 2146 provide the user with sound effects via a Bluetooth connection, although any sort of similar wireless technology could be substituted freely. In some embodiments, wireless headphones 2146 may include microphone 2145 or binaural microphone 2147, to allow multiple users, instructors, or observers to communicate. Binaural microphone 2147 typically includes microphones on each ear piece, to capture sounds modified by the user's head shadow. This feature may be used for binaural hearing and sound localization by other simulation participants.

Gaming apparatus 2100 may include any number of sensors 2110 that measure ambient brightness, motion, position, orientation, and the like. For example, gaming apparatus 2100 may detect absolute heading with a digital compass, and detect relative motion with an x-y-z gyroscope or accelerometer. In some embodiments, gaming apparatus 2100 also includes a second accelerometer or gyroscope to detect the relative orientation of the device, or its rapid acceleration or deceleration. In other embodiments, gaming apparatus 2100 may include a Global Positioning Satellite (GPS) sensor, to detect absolute position as the user travels in terrestrial space.

Gaming apparatus 2100 may include battery 2141 and/or diagnostic lights 2143. For example, battery 2141 may be a rechargeable battery, and diagnostic lights 2143 could indicate the current charge of the battery. In another example, battery 2141 may be a removable battery clip, and gaming apparatus 2100 may have an additional battery, electrical capacitor or super-capacitor to allow for continued operation of the apparatus while the discharged battery is replaced with a charged battery. In other embodiments, diagnostic lights 2143 can inform the user or a service technician about the status of the electronic components included within or connected to this device. For example, diagnostic lights 2143 may indicate the strength of a received wireless signal, or the presence or absence of a memory card. Diagnostic lights 2143 could also be replaced by any small screen, such as an organic light emitting diode or liquid crystal display screen. Such lights or screens could be on the exterior surface of gaming apparatus 2100, or below the surface, if the shell for this apparatus is translucent or transparent.

Other components of gaming apparatus 2100 may be removable, detachable or separable from this device. For example, the 3D imaging system may be detachable or separable from gaming housing 2149. In some embodiments, the subcomponents of the 3D imaging system may be detachable or separable from gaming housing 2149, and still function.

Figure 22:
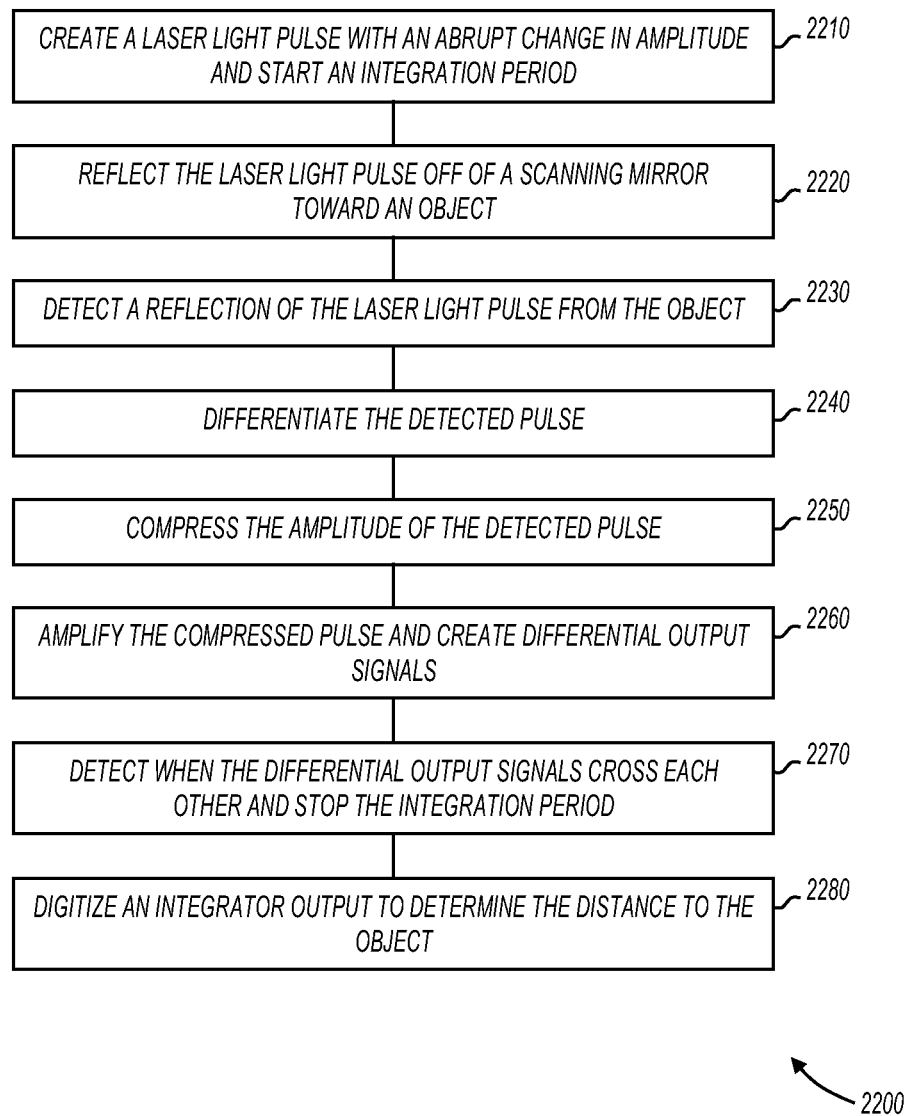
FIGS. 22-24 show flow diagrams of methods in accordance with various embodiments of the present invention.

FIG. 22 shows a flow diagram of methods in accordance with various embodiments of the present invention. In some embodiments, method 2200, or portions thereof, is performed by a TOF distance measurement apparatus, embodiments of which are shown in previous figures. Further, in some embodiments, method 2200, or portions thereof, is performed by a 3D imaging system, embodiments of which are shown in previous figures. In other embodiments, method 2200 is performed by a series of circuits or an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2210. As shown at 2210, a laser light pulse with an abrupt change in amplitude is created, and an integration period is started. In some embodiments, the laser light pulse is a triangle shaped pulse. The laser light pulse will be used for distance measurement based on a round trip time-of-flight (TOF) of the laser pulse to an object. The integration period is started when the laser light pulse is created, and will be stopped when the return pulse is detected. In some embodiments, the actions of 2210 correspond to control circuit 150 commanding driver 160 to create a pulse, pulse shaping circuit 162 shaping the pulse to have an abrupt change in amplitude, and light source 164 creating a light pulse. Further, in some embodiments, the actions of 2210 correspond to control circuit 150 commanding integrator 130 to start an integration period as shown in FIG. 2.

At 2220, the laser light pulse is reflected off of a scanning mirror toward an object. This may correspond to the light pulse being reflected off scanning mirror 116, or may correspond to the light pulse being reflected off of a first single axis scanning mirror and then off a second single mirror scanning mirror. The scanning mirror scans such that successive light pulses traverse a raster pattern (e.g., raster pattern 126).

At 2230, a reflection of the laser light pulse from the object is detected. This may be performed by a photodetector such as PD 180. At 2240, the detected pulse is differentiated. This results in a pulse with a zero crossing in place of the abrupt change in amplitude. See 183, FIG. 7. At 2250, the amplitude of the differentiated pulse is compressed to prevent saturation of downstream circuits. Compression may be performed in part because the TOF measurement is relatively insensitive to the amplitude of the differentiated pulse. An example of a compressed pulse is shown at 711 in FIG. 7.

At 2260, the compressed pulse is amplified and differential output signals are generated. See 185, FIG. 7. At 2270, a cross detector detects when the differential output signals cross each other, and the integration period is stopped. At 2280, the output voltage of an integrator that has integrated over the integration period is digitized. The digitized value represents the TOF of the laser pulse, and the distance to the object.

In some embodiments, a reference signal path is included (see FIG. 8). First and second integrators are started at the same time, and a first integrator is stopped when a cross point is detected in the reference path and a second integrator is stopped when a cross point is detected in the reflection path. The difference between the two integrator output voltages represents the TOF/distance.

Method 2200 may be repeated as the scanning mirror scans in one or two dimensions, thereby creating a 3D image of the object. The 3D image may be refreshed every repetition of the raster pattern, or less often.

Figure 23:
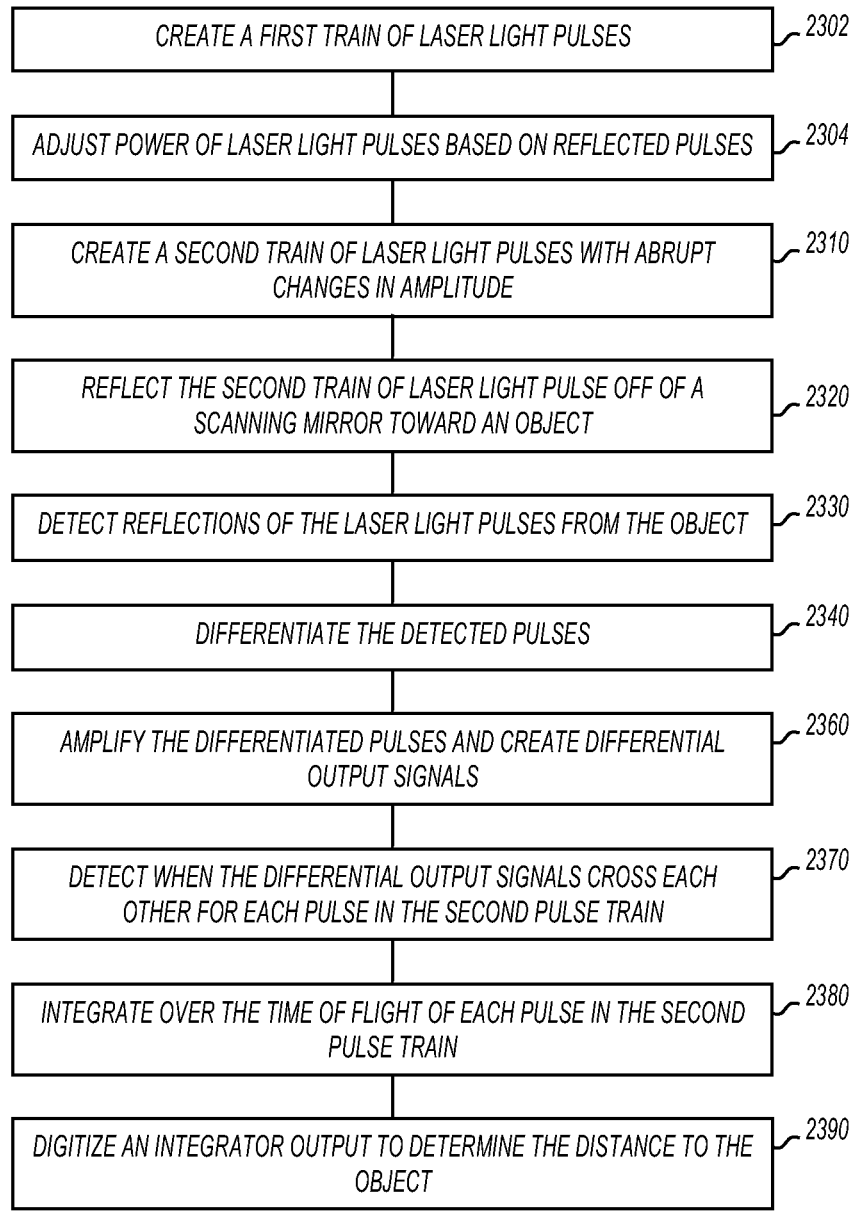

FIG. 23 shows a flow diagram of methods in accordance with various embodiments of the present invention. In some embodiments, method 2300, or portions thereof, is performed by a TOF distance measurement apparatus, embodiments of which are shown in previous figures. Further, in some embodiments, method 2300, or portions thereof, is performed by a 3D imaging system, embodiments of which are shown in previous figures. In other embodiments, method 2300 is performed by a series of circuits or an electronic system. Method 2300 is not limited by the particular type of apparatus performing the method. The various actions in method 2300 may be performed in the order presented, or may be performed in a different order. Further, in some embodiments, some actions listed in FIG. 23 are omitted from method 2300.

Method 2300 is shown beginning with block 2302. As shown at 2302, a first train of laser light pulses is created. This corresponds to a train of power adjustment pulses as shown in FIG. 4. At 2304, power of laser light pulses is adjusted based on reflected pulses. This corresponds to the operation of power control circuit 152 modifying the power that will be used to create the measurement pulse(s).

At 2310, a second train of laser light pulses is created. This second train of pulses has power as determined at 2304. Further, the pulses in the second pulse train have an abrupt change in amplitude. In some embodiments, the pulses are triangle shaped pulses. The laser light pulses will be used for distance measurement based on a round trip time-of-flight (TOF) of the laser pulse to an object. In some embodiments, the actions of 2310 correspond to control circuit 150 commanding driver 160 to create a pulse train, pulse shaping circuit 162 shaping the pulse to have an abrupt change in amplitude, and light source 164 creating a light pulse.

At 2320, the second train of laser light pulses is reflected off of a scanning mirror toward an object. This may correspond to the light pulses being reflected off scanning mirror 116, or may correspond to the light pulse being reflected off of a first single axis scanning mirror and then off a second single mirror scanning mirror. The scanning mirror scans such that successive light pulses traverse a raster pattern (e.g., raster pattern 126).

At 2330, reflections of the laser light pulses from the object are detected. This may be performed by a photodetector such as PD 180. At 2340, the detected pulses are differentiated. This results in pulses with a zero crossings in place of the abrupt changes in amplitude. See 183, FIG. 7.

At 2360, the differentiated pulses are amplified and differential output signals are generated. See 185, FIG. 7. At 2370, a cross detector detects when the differential output signals cross each other for each pulse in the second pulse train. At 2380, an integrator integrates over the time of flight of each pulse in the second pulse train. In some embodiments, this corresponds to an integrator starting and stopping for each pulse as shown in FIG. 4. At 2390, the output voltage of an integrator that has integrated over the integration periods is digitized. The digitized value represents the TOF of the laser pulse, and the distance to the object.

In some embodiments, a reference signal path is included (see FIG. 5). First and second integrators are started at the same time, and a first integrator is stopped when a cross point is detected in the reference path and a second integrator is stopped when a cross point is detected in the reflection path. The difference between the two integrator output voltages represents the TOF/distance.

Method 2300 may be repeated as the scanning mirror scans in one or two dimensions, thereby creating a 3D image of the object. The 3D image may be refreshed every repetition of the raster pattern, or less often.

Figure 24:
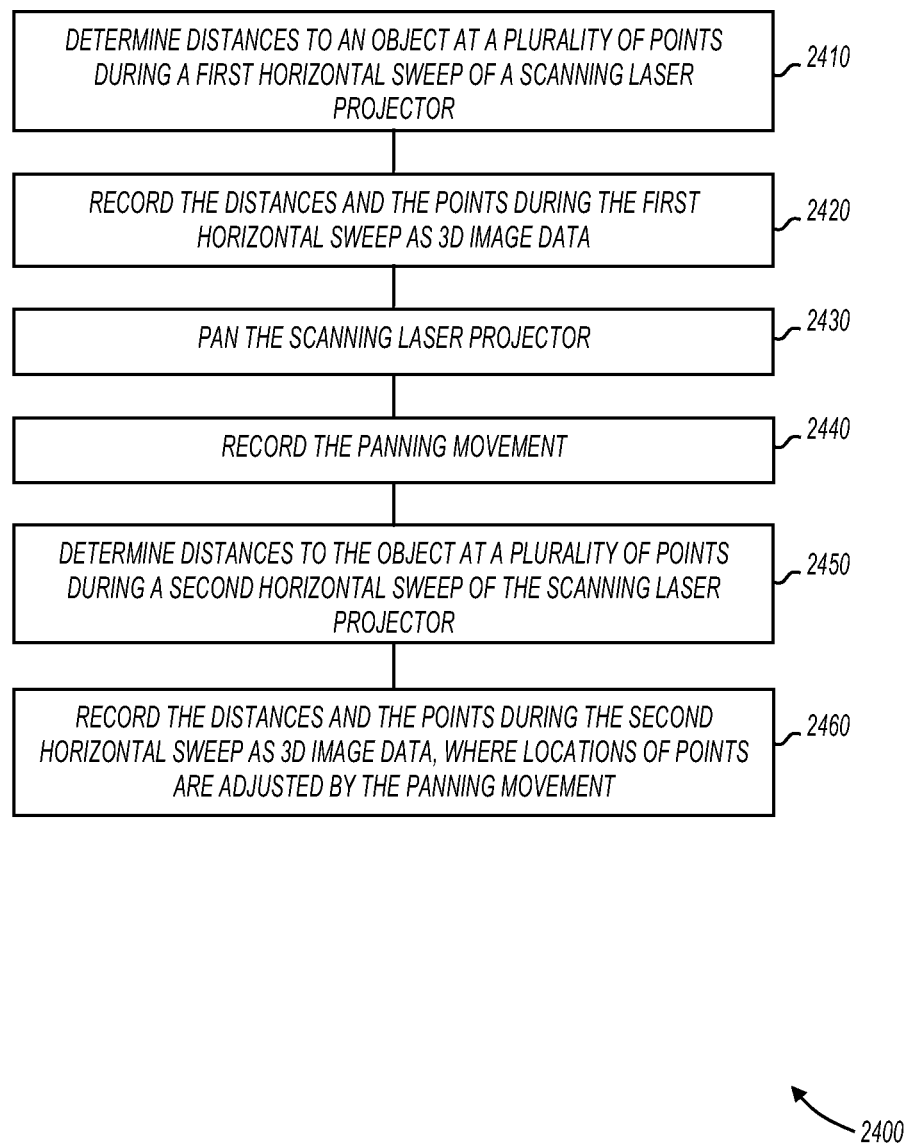

FIG. 24 shows a flow diagram of methods in accordance with various embodiments of the present invention. In some embodiments, method 2400, or portions thereof, is performed by a TOF distance measurement apparatus, embodiments of which are shown in previous figures. Further, in some embodiments, method 2400, or portions thereof, is performed by a 3D imaging system, embodiments of which are shown in previous figures. In other embodiments, method 2400 is performed by a series of circuits or an electronic system. Method 2400 is not limited by the particular type of apparatus performing the method. The various actions in method 2400 may be performed in the order presented, or may be performed in a different order. Further, in some embodiments, some actions listed in FIG. 24 are omitted from method 2400.

Method 2400 is shown beginning with block 2410. As shown at 2410, distances to an object are determined at a plurality of points during a first horizontal sweep of a scanning laser projector. In some embodiments, this corresponds to a 3D imaging device such as 3D imaging device 1000 (FIG. 10) measuring a distances as a scanning mirror sweeps. Examples of measurement times during horizontal sweeps are shown in FIG. 11.

At 2420, the distances and the points during the first horizontal sweep are recorded as 3D image data. At 2430, the scanning laser projector is panned, and at 2440, the panning movement is recorded. In some embodiments, this corresponds to the scanning laser projector being responsive to motion sensing devices or orientation sensing devices, such as accelerometer 1010 and/or gyroscope 1020 (FIG. 10).

At 2450, distances to an object are determined at a plurality of points during a second horizontal sweep of a scanning laser projector. In some embodiments, this corresponds to a 3D imaging device such as 3D imaging device 1000 (FIG. 10) measuring a distances as a scanning mirror sweeps. Examples of measurement times during horizontal sweeps are shown in FIG. 11. The measurement points occur at the same relative time within the horizontal sweep; however, because the scanning laser projector has been panned, the measurement points fall at different locations on the object. At 2460, the distance and points during the second horizontal sweep are recorded as 3D image data, where locations of points are adjusted by the panning movement recorded at 2440.

In some embodiments, the first and second horizontal sweeps are during the same frame and in some embodiments they are in subsequent frames. In some embodiments, panning movement is constantly recorded and all measurement locations are adjusted on the fly taking into account the projector movement.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:
1. An apparatus comprising:
a laser light source;
a pulse shaping circuit to drive the laser light source with pulses having an abrupt change in amplitude;
a photodetector to detect reflected light pulses;
a differentiator coupled to the photodetector to differentiate detected pulses;
a compression circuit to compress output signals from the differentiator;
an amplifier to receive compressed signals from the compression circuit and to generate differential output signals;
a detection circuit to detect when the differential output signals cross each other; and
an integrator responsive to the detection circuit for time measurement.
2. The apparatus of claim 1 wherein the pulse shaping circuit is configured to create triangle shaped pulses.

3. The apparatus of claim 1 further comprising at least one scanning mirror to reflect and scan light from the laser light source.
4. The apparatus of claim 3 wherein the laser light source produces light in the nonvisible spectrum.
5. The apparatus of claim 4 wherein the laser light source produces infrared light.
6. The apparatus of claim 4 further comprising at least one laser light source to produce light in the visible spectrum.
7. The apparatus of claim 6 further comprising image processing circuitry to modulate the at least one visible laser light source to display an image while measuring distance at multiple points in a field of view.
8. The apparatus of claim 1 further comprising a second photodetector coupled in a reference signal path to compensate for timing variations.
9. An apparatus comprising:
a laser light source;
a pulse shaping circuit to drive the laser light source with pulses having an abrupt change in amplitude;
a photodetector to detect reflected light pulses;
a differentiator coupled to the photodetector to differentiate detected pulses;
an amplifier to receive signals from the differentiator and to generate differential output signals;
a detection circuit to detect when the differential output signals cross each other;
a power control circuit to modify signal gain at an input to the laser light source in response to a first light pulse train; and
an integrator responsive to the detection circuit for time measurement to integrate over a second light pulse train for time measurement.
10. The apparatus of claim 9 further comprising at least one scanning mirror to reflect and scan light from the laser light source.
11. The apparatus of claim 10 wherein the laser light source produces light in the nonvisible spectrum.
12. The apparatus of claim 11 wherein the laser light source produces infrared light.
13. The apparatus of claim 11 further comprising at least one laser light source to produce light in the visible spectrum.
14. The apparatus of claim 13 further comprising image processing circuitry to drive the at least one laser light source to produce light in the visible spectrum to display an image with visible light while performing distance measurements with nonvisible light.
15. A mobile device comprising:
a scanning laser projector having at least one visible laser light source and a scanning mirror; and
a time of flight distance measurement device that includes a nonvisible laser light source to illuminate the scanning mirror with laser light pulses, and that includes a receive signal path that differentiates signals representing reflected laser light pulses, and a power control circuit responsive to the receive signal path;
wherein the power control circuit modifies a power level of a second train of light pulses emitted by the nonvisible laser light source in response to reflections from a first train of light pulses emitted by the nonvisible laser light source.
16. The mobile device of claim 15 wherein the mobile device further comprises a wireless interface.

17. The mobile device of claim 15 wherein the time of flight distance measurement device further includes an amplifier to receive differentiated signals and to generate differential output signals.

18. The mobile device of claim 17 wherein the time of flight distance measurement device further includes a detection circuit to detect when the differential output signals cross each other.

19. The mobile device of claim 18 wherein the time of flight distance measurement device further includes an integrator responsive to the detection circuit for time measurement.

20. The mobile device of claim 16 wherein the scanning mirror is configured to scan in two dimensions.

* * * * *